(12) United States Patent
Yamada et al.

(10) Patent No.: US 9,802,160 B2
(45) Date of Patent: Oct. 31, 2017

(54) SEPARATION MEMBRANE, SHEET FLOW PATH MATERIAL, AND SEPARATION MEMBRANE ELEMENT

(71) Applicant: TORAY INDUSTRIES, INC., Tokyo (JP)

(72) Inventors: Hiroyuki Yamada, Shiga (JP); Hiroho Hirozawa, Shiga (JP); Kentaro Takagi, Shiga (JP); Yoshiki Okamoto, Shiga (JP); Yoshie Marutani, Shiga (JP); Shunsuke Tabayashi, Ehime (JP); Takao Sasaki, Shiga (JP); Masahiro Kimura, Shiga (JP); Yuji Tanaka, Shiga (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 15/033,488

(22) PCT Filed: Oct. 30, 2014

(86) PCT No.: PCT/JP2014/078989
§ 371 (c)(1),
(2) Date: Apr. 29, 2016

(87) PCT Pub. No.: WO2015/064720
PCT Pub. Date: May 7, 2015

(65) Prior Publication Data
US 2016/0271564 A1    Sep. 22, 2016

(30) Foreign Application Priority Data

Oct. 30, 2013 (JP) .................................. 2013-225516

(51) Int. Cl.
*B01D 63/10* (2006.01)
*B01D 69/12* (2006.01)
(Continued)

(52) U.S. Cl.
CPC ............. *B01D 63/10* (2013.01); *B01D 69/12* (2013.01); *C08L 23/10* (2013.01); *C08L 23/12* (2013.01);
(Continued)

(58) Field of Classification Search
CPC .......... B01D 2313/146; B01D 2325/00; B01D 2325/08; B01D 63/10; B01D 69/12;
(Continued)

(56) References Cited

U.S. PATENT DOCUMENTS

| 6,454,942 B1 | 9/2002 | Shintani et al. |
| 2005/0008815 A1 | 1/2005 | Sukigara et al. |

(Continued)

FOREIGN PATENT DOCUMENTS

| CN | 1276261 A | 12/2000 |
| CN | 1578804 A | 2/2005 |

(Continued)

OTHER PUBLICATIONS

International Search Report for PCT/JP2014/078989 mailed on Feb. 10, 2015, Nov. 28, 2016.

(Continued)

*Primary Examiner* — John Kim
(74) *Attorney, Agent, or Firm* — Birch, Stewart, Kolasch & Birch, LLP

(57) ABSTRACT

The present invention provides a separation membrane and a separation membrane element which are capable of exhibiting good water production performance and excellent in handleability and process passage. A separation membrane of the present invention is a separation membrane including: a separation membrane main body having a feed-side face and a permeate-side face; and a permeate-side channel member adhered to the permeate-side face of the separation membrane main body, in which the permeate-side channel (Continued)

member includes a composition containing at least a high-crystalline polypropylene (A) and satisfies the following requirements (a) and (b):
  (a) a content of the high-crystalline polypropylene (A) in the composition is from 40 to 95% by weight; and
  (b) the permeate-side channel member has a melting endothermic energy amount ($\Delta H$) of from 20 to 70 J/g.

9 Claims, 11 Drawing Sheets

(51) Int. Cl.
  *C08L 23/12* (2006.01)
  *C08L 23/16* (2006.01)
  *C08L 53/00* (2006.01)
  *C08L 23/10* (2006.01)
(52) U.S. Cl.
  CPC .............. *C08L 23/16* (2013.01); *C08L 53/00* (2013.01); *B01D 2313/146* (2013.01); *B01D 2325/00* (2013.01); *B01D 2325/08* (2013.01); *C08L 2205/025* (2013.01); *C08L 2205/03* (2013.01); *C08L 2205/035* (2013.01)
(58) Field of Classification Search
  CPC ........... C08L 2205/025; C08L 2205/03; C08L 2205/035; C08L 23/10; C08L 23/12; C08L 23/16; C08L 53/00
  See application file for complete search history.

(56) References Cited

U.S. PATENT DOCUMENTS

| | | |
|---|---|---|
| 2007/0264483 A1 | 11/2007 | Ozaki et al. |
| 2011/0206973 A1 | 8/2011 | Brant et al. |
| 2012/0261333 A1 | 10/2012 | Moran et al. |
| 2012/0302982 A1 | 11/2012 | Takebe et al. |
| 2013/0020251 A1 | 1/2013 | Ichikawa et al. |
| 2013/0175214 A1 | 7/2013 | Takagi et al. |
| 2013/0213880 A1 | 8/2013 | Hirozawa et al. |
| 2013/0334128 A1 | 12/2013 | Takagi et al. |
| 2014/0224726 A1 | 8/2014 | Kimura et al. |
| 2014/0231332 A1 | 8/2014 | Hirozawa et al. |
| 2014/0251896 A1 | 9/2014 | Hirozawa et al. |
| 2015/0041388 A1 | 2/2015 | Hirozawa et al. |
| 2015/0068971 A1 | 3/2015 | Koiwa et al. |

FOREIGN PATENT DOCUMENTS

| | | |
|---|---|---|
| CN | 202151550 U | 2/2012 |
| CN | 102781559 A | 11/2012 |
| CN | 102917776 A | 2/2013 |
| CN | 103167904 A | 6/2013 |
| CN | 103201023 A | 7/2013 |
| CN | 103282105 A | 9/2013 |
| IL | 64466 A | 1/1986 |
| JP | 10-53673 A | 2/1998 |
| JP | 2009-537638 A | 10/2009 |
| JP | 2011-168944 A | 9/2011 |
| JP | 2012-40487 A | 3/2012 |
| JP | 2012-506792 A | 3/2012 |
| JP | 2012-161748 A | 8/2012 |
| WO | WO 2011/152484 A1 | 12/2011 |
| WO | WO 2012/142429 A2 | 10/2012 |
| WO | WO 2013/047746 A1 | 4/2013 |
| WO | WO 2013/125505 A1 | 8/2013 |

OTHER PUBLICATIONS

Japanese Office Action 2014-557654 dated on Oct. 20, 2015.
Written Opinion of the International Searching Authority for PCT/JP2014/078989 mailed on Feb. 10, 2015.
Chinese Office Action and Search Report issued in Chinese Application No. 201480060087.X on Feb. 24, 2017, together with an English translation of the Chinese Office Action.
Extended European Search Report, dated May 30, 2017, for European Application No. 14857212.6.

SEPARATION MEMBRANE, SHEET FLOW PATH MATERIAL, AND SEPARATION MEMBRANE ELEMENT

TECHNICAL FIELD

The present invention relates to a separation membrane, a sheet channel member and a separation membrane element for use in separation of ingredients contained in fluid such as liquid and gas. More specifically, the present invention relates to a separation membrane or a sheet channel member having excellent handleability and relates to a separation membrane element having stable performance.

BACKGROUND ART

For separating ingredients contained in fluid such as liquid and gas, various methods have been proposed. For example, in the recent technique for removal of ionic substances contained in seawater, brackish water or the like, separation methods utilizing separation membrane elements have found increasing uses as processes for energy savings and conservation of resources.

Separation membranes adopted in the separation methods utilizing separation membrane elements are classified into groups of microfiltration membranes, ultrafiltration membranes, nanofiltration membranes, reverse osmosis membranes and forward osmosis membranes, based on their pore sizes and separation performance. These membranes have been used in e.g. production of drinkable water from seawater, brackish water or water containing deleterious substances, production of ultrapure water for industrial uses, effluent treatment, recovery of valuable substances, or the like, and membranes to be used therein have been changed to suit the ingredients targeted for separation and separation performance requirements.

Separation membrane elements have commonality in the sense that a raw fluid is fed to one surface of a separation membrane and a permeated fluid is obtained from the other surface of the separation membrane. By having a plurality of separation membranes tied in a bundle, each separation membrane element is configured to secure a large membrane area to give a large amount of a permeated fluid per the unit element, and various types of elements, such as those of a spiral type, a hollow fiber type, a plate-and-frame type, a rotating flat-membrane type and a flat-membrane integration type, have been produced in accordance with their intended uses and purposes.

For example, spiral-type separation membrane elements have been widely used in reverse osmosis filtration. The spiral-type separation membrane element is provided with a perforated water collection tube, a feed-side channel member for feeding a raw fluid to a separation membrane, a separation membrane for separating ingredients contained in the raw fluid, and a permeate-side channel member for leading the permeated fluid that has permeated through the separation membrane toward the perforated water collection tube. The feed-side channel member, the separation membrane and the permeate-side channel member are wound around the perforated water collection tube. The spiral-type separation membrane element applies pressure to a raw fluid to thereby take out a permeated fluid in greater quantity, and is therefore used widely.

With the recent increase in the demand for reduction in water production cost, a need for cost reduction in producing separation membrane elements is increasing, and cost reduction by improving separation membranes, channel members and separation membrane element members has been proposed. For example, in Patent Documents 1 to 3, in a spiral-type separation membrane element, there are provided channel members arranged in a dot-like or stripe-like pattern on the front surface or the back surface of a flat membrane. In Patent Document 4, there is provided a channel membrane formed of a fibrous substance on a sheet.

BACKGROUND ART DOCUMENT

Patent Document

Patent Document 1: WO 2011/152484
Patent Document 2: JP-A-2012-40487
Patent Document 3: JP-A-2012-161748
Patent Document 4: WO 2012/142429

SUMMARY OF THE INVENTION

Problems that the Invention is to Solve

However, the separation membrane elements described in Patent Documents 1 to 4 can attain high-performance water production and safety operation by driving them under pressure condition, but on the other hand, the separation membrane or the sheet channel member that are the constituent members of the separation membrane elements are curled and therefore in the process of producing the elements, the handleability thereof is problematic.

Given the situation, an object of the present invention is to provide a separation membrane or a sheet channel member that can solve the problem of curling of the separation membrane or the sheet channel member and are excellent in handleability while exhibiting excellent water production performance even when driven under pressure condition.

Means for Solving the Problems

The present inventors have assiduously studied for the purpose of solving the above-mentioned problems and, as a result, have succeeded in solving the problem of curling of a separation membrane or a sheet channel member and in providing a separation membrane or a sheet channel member excellent in handleability, and have completed the present invention.

Namely, gist of the present invention includes the following configurations.

A first invention is a separation membrane including: a separation membrane main body having a feed-side face and a permeate-side face; and a permeate-side channel member adhered to the permeate-side face of the separation membrane main body, in which the permeate-side channel member includes a composition containing at least a high-crystalline polypropylene (A) and satisfies the following requirements (a) and (b):

(a) a content of the high-crystalline polypropylene (A) in the composition is from 40 to 95% by weight; and (b) the permeate-side channel member has a melting endothermic energy amount ($\Delta H$) of from 20 to 70 J/g.

A second invention is the separation membrane according to the first invention, in which the composition contains a low-crystalline α-olefin polymer (B), and a content of the low-crystalline α-olefin polymer (B) in the composition is from 5 to 60% by weight.

A third invention is the separation membrane according to the second invention, in which the low-crystalline α-olefin polymer (B) is a low-crystalline polypropylene or propylene/olefin copolymer.

A fourth invention is the separation membrane according to any one of the first to third inventions, in which the permeate-side channel member has a tensile elongation of 5% or more and a tensile elasticity of from 0.2 to 2.0 GPa.

A fifth invention is the separation membrane according to any one of the first to fourth inventions, in which the separation membrane main body includes a substrate, a porous supporting layer formed on the substrate, and a separation functional layer formed on the porous supporting layer.

A sixth invention is a separation membrane element including the separation membrane according to any one of the first to fifth inventions.

A seventh invention is a sheet channel member having projections fixed to a sheet, in which the projections include a composition containing at least a high-crystalline polypropylene (A) and satisfy the following requirements (a) and (b):

(a) a content of the high-crystalline polypropylene (A) in the composition is from 40 to 95% by weight; and (b) the projections have a melting endothermic energy amount ($\Delta H$) of from 20 to 70 J/g.

An eighth invention is the sheet channel member according to the seventh invention, in which the composition contains a low-crystalline $\alpha$-olefin polymer (B), and a content of the low-crystalline $\alpha$-olefin polymer (B) in the composition is from 5 to 60% by weight.

A ninth invention is the sheet channel member according to the eighth invention, in which the low-crystalline $\alpha$-olefin polymer (B) is a low-crystalline polypropylene or propylene/olefin copolymer.

A tenth invention is the sheet channel member according to any one of the seventh to ninth inventions, in which the projections have a tensile elongation of 5% or more and a tensile elasticity of from 0.2 to 2.0 GPa.

An eleventh invention is a separation membrane element including the sheet channel member according to any one of the seventh to tenth inventions.

Advantage of the Invention

According to the present invention, a high-crystalline polypropylene is contained in a specific range in the component constituting the channel member and the melting heat quantity of the channel member is controlled to fall within a specific range, whereby the separation membrane or the sheet channel member can be prevented from curling. As a result, the handleability of the separation membrane or the sheet channel member as well as the passage thereof in the process of producing a separation membrane element is thereby improved, and a separation membrane element capable of exhibiting stable performance even in operation under pressure condition can be obtained.

MODE FOR CARRYING OUT THE INVENTION

The separation membrane and the separation membrane element of the present invention are described in detail hereinunder.

1. Separation Membrane Element

Figure 1:
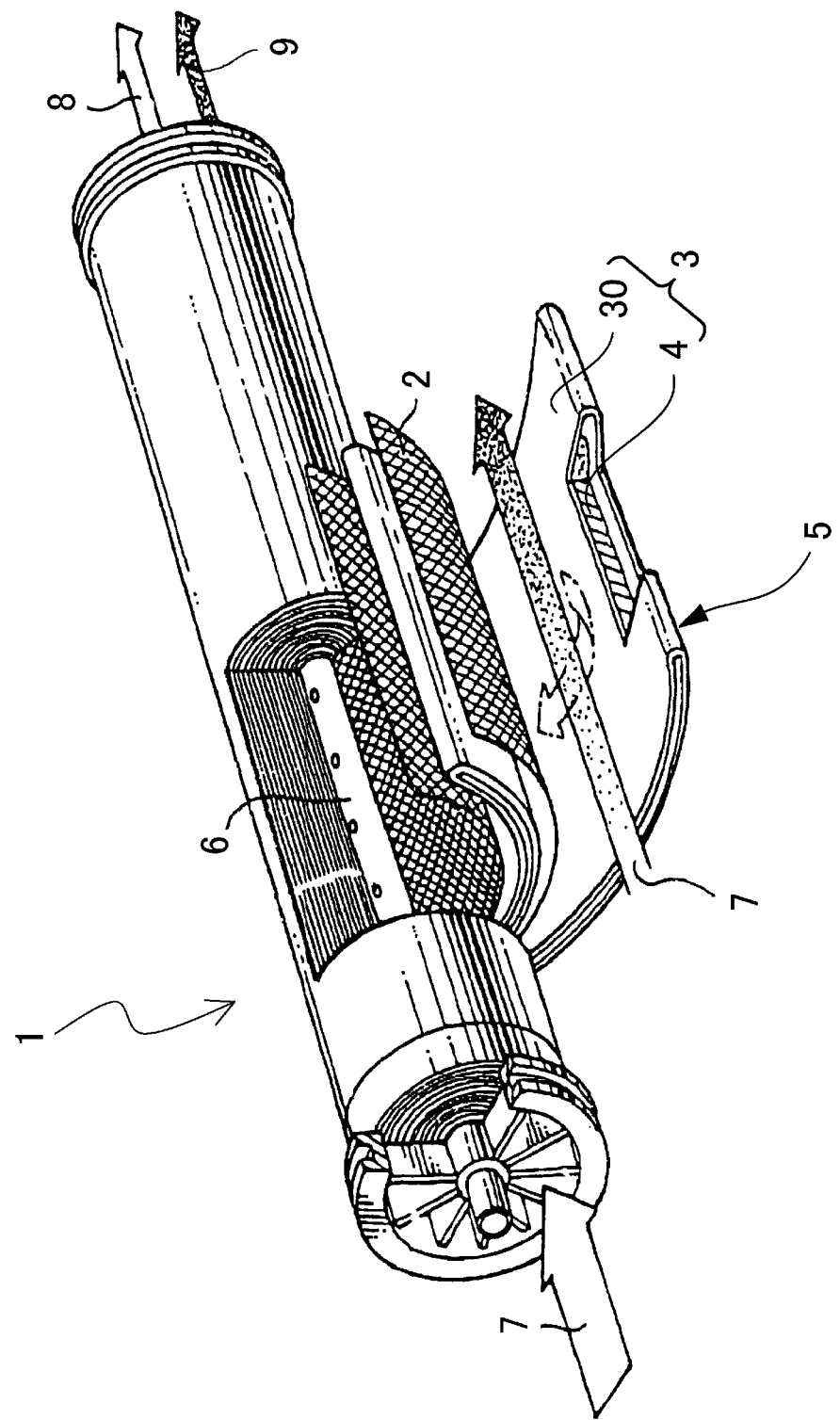
FIG. 1 is a partly developed perspective view showing an outline of a separation membrane element.

As shown in FIG. 1, the separation membrane element 1 includes a water collection tube 6, and a separation membrane 3 wound around the water collection tube 6. The separation membrane element 1 further includes members such as a feed-side channel member 2 and a side plate.

The separation membrane 3 includes a separation membrane main body 30 and a permeate-side channel member 4 arranged on the permeate-side face of the separation membrane main body 30.

The separation membrane 3 forms a rectangular envelop-like membrane 5 with the inside thereof facing the permeate-side. The envelop-like membrane 5 opens only on one side thereof so that permeated water flows through the water collection tube 6, and is sealed on the other three sides. The permeated water is separated from the feed water by the envelop-like membrane 5.

The feed-side channel member 2 is arranged between the envelop-like membranes 5, or that is, between the feed-side faces of the separation membrane 3. The feed-side channel member 2 and the plurality of envelop-like membranes 5 are stacked and wound around the water collection tube 6.

Raw water fed from one end in the lengthwise direction of the separation membrane element 1 (shown as "feed water 7" in the drawing) passes through the flow channel formed by the feed-side channel member 2 and is fed to the separation membrane main body 30.

The water having penetrated through the separation membrane main body 30 (shown as "permeated water 8" in the drawing) runs through the flow channel formed by the permeate-side channel member 4 and flows into the water collection tube 6. In that manner, the permeated water 8 is collected from one end of the water collection tube 6.

On the other hand, water not having penetrated through the separation membrane main body 30 (shown as "concentrated water 9" in the drawing) is collected from the other end of the separation membrane element 1.

The separation membrane element 1 shown in FIG. 1 is one example of a configuration of a spiral-type separation membrane element including a water collection tube and a separation membrane wound around the water collection tube, and the present invention is not limited to this embodiment.

2. Separation Membrane

As the separation membrane 3 to be used in the above-mentioned separation membrane element, various embodiments of separation membranes to be mentioned below are applicable. Various embodiments are described with reference to the drawings, and in the following, the same factors described in different drawings may be given the same numeral reference signs and the description thereof given in one drawing may be omitted in the other drawings.

(2-1) Outline

The separation membrane refers to a membrane which makes it possible to separate ingredients contained in a fluid fed to the surface of the separation membrane and to obtain a permeated fluid having permeated through the separation membrane. The separation membrane includes a separation membrane main body and a channel member arranged on the separation membrane main body.

Figure 2:
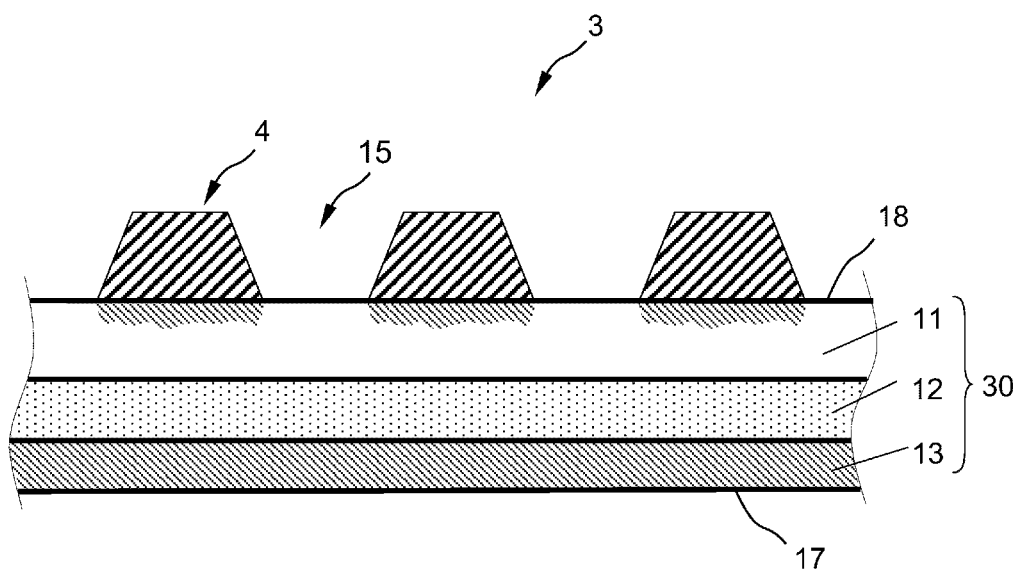
FIG. 2 is a cross-sectional view showing one example of a separation membrane including a permeate-side channel member.

One example of such a separation membrane is shown in FIG. 2. As shown in FIG. 2, the separation membrane 3 includes a separation membrane main body 30 and a permeate-side channel member 4. The separation membrane main body 30 has a feed-side face 17 and a permeate-side face 18.

In the present invention, the term "feed-side face" of a separation membrane main body refers to the surface which is one of the two faces of a separation membrane main body and is the side to which a raw fluid (feed water 7) is to be fed. The term "permeate-side face" refers to the face on the opposite side. When the separation membrane main body includes a substrate 11 and a separation functional layer 13, in general, the face on the side of the separation functional layer 13 is the feed-side face and the face on the side of the substrate 11 is the permeate-side face.

(2-2) Separation Membrane Main Body (2-2-1) Outline

As the separation membrane main body 30, a membrane having separation performance appropriate to the usage and intended purpose thereof and so on is used. The separation membrane main body 30 may be formed into a single layer, or it may be formed into a composite membrane including a substrate and a separation functional layer.

Figure 3:
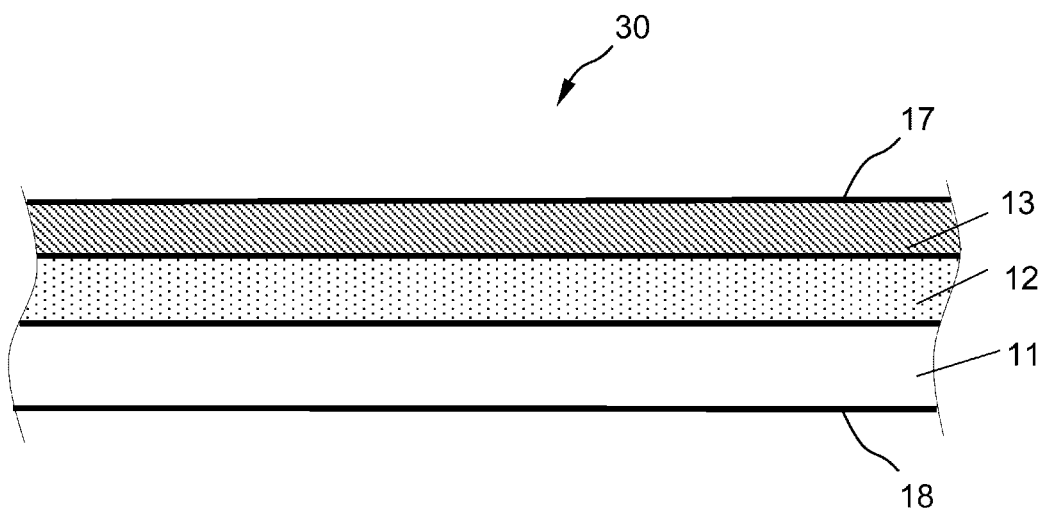
FIG. 3 is a cross-sectional view showing one example of a separation membrane main body.
Figure 4:
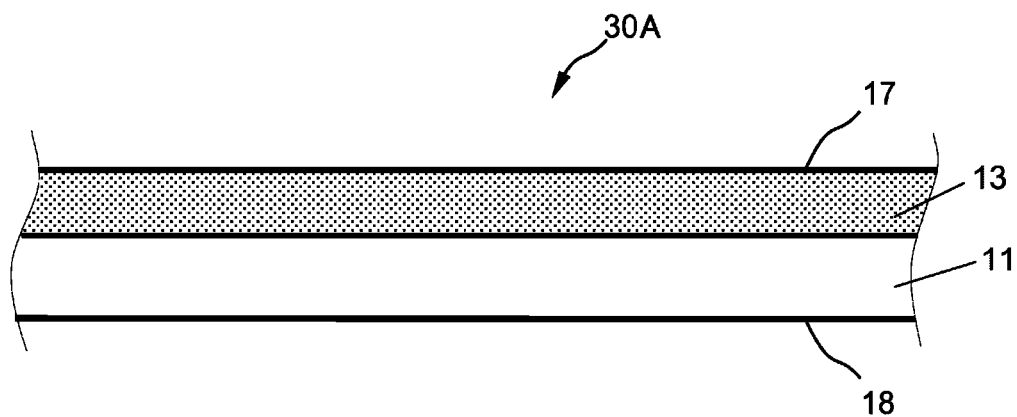
FIG. 4 is a cross-sectional view showing another example of a separation membrane main body.

Examples of the composite membrane are shown in FIG. 3 and FIG. 4. The separation membrane main body 30 shown in FIG. 3 includes a substrate 11, a porous supporting layer 12 and a separation functional layer 13. On the other hand, the separation membrane main body 30A shown in FIG. 4 includes two layers of a substrate 11 and a separation functional layer 13. The respective layers are described below.

(2-2-2) Separation Functional Layer

The thickness of the separation functional layer 13, though it has no numerical value limits in the concrete, is preferably in a range of 5 to 3000 nm in view of separation performance and permeation performance. In the cases of a reverse osmosis membrane, a forward osmosis membrane and a nanofiltration membrane in particular, it is preferable that each membrane has a thickness of 5 to 300 nm.

The thickness of the separation functional layer can be determined in accordance with any of traditional methods to measure separation membrane thickness. For example, a separation membrane is embedded in a resin, and cut into ultrathin slices. The slices obtained are subjected to some treatment, such as dyeing. Then, they are observed under a transmission electron microscope, whereby thickness measurements become possible. When the separation functional layer has a pleated structure, on the other hand, the thickness thereof can be determined by making height measurements on 20 pleats at intervals of 50 nm in the direction of cross-sectional length of the pleated structure located above the porous supporting layer and calculating the average of these heights measured.

The separation functional layer may be a layer having both a separation function and a support function, or it may be a layer having a separation function alone. Additionally, the term "separation functional layer" refers to the layer having at least a separation function.

When the separation functional layer has both a separation function and a support function (the case of FIG. 4), a layer containing cellulose-based polymer, polyvinylidene fluoride, polyether sulfone or polysulfone as a main component is preferably applied to such a separation functional layer.

On the other hand, when the separation functional layer is arranged as an additional layer different from the porous supporting layer (the case of FIG. 3), a crosslinked polymer is preferably used as a material for constituting the porous supporting layer, from the viewpoint of easy pore size control and excellent durability. In particular, from the viewpoint of excellent performance of separation of components contained in a raw fluid, a polyamide separation functional layer formed through polycondensation of a multifunctional amine and a multifunctional acid halide, an organic-inorganic hybrid functional layer or the like is favorably used. These separation functional layers may be formed through polycondensation of monomers on a porous supporting layer.

For example, the separation functional layer may contain a polyamide as the main component. The membrane of the type may be formed through interfacial polycondensation of a multifunctional amine and a multifunctional acid halide according to a known method. For example, an aqueous solution of a multifunctional amine is applied onto a porous supporting layer, the excessive aqueous amine solution is removed with an air knife, and thereafter an organic solvent solution containing a multifunctional acid halide is applied thereon to form a polyamide separation functional layer.

The separation functional layer may have an organic-inorganic hybrid structure containing silicon or the like. The separation functional layer having an organic-inorganic hybrid structure can contain e.g. the following compounds (A) and (B):

(A) a silicon compound containing a silicon atom to which a reactive group having an ethylenic unsaturated group and a hydrolyzable group are directly bonded, and (B) an ethylenic unsaturated group-containing compound other than the compound (A).

Specifically, the separation functional layer may contain a condensation product of the hydrolyzable group in the compound (A) and polymerization products of the ethylenic unsaturated groups in the compound (A) and/or the compound (B). Namely, the separation functional layer may contain at least one of the following polymerization products:

polymerization products formed through the condensation and/or the polymerization of the compound (A) alone;

polymerization products formed through the polymerization of the compound (B) alone; and products formed through the copolymerization of the compound (A) and the compound (B).

Additionally, condensates are included in the polymerization products. And the compound (A) may undergo condensation via its hydrolyzable group in the interior of the compound (A)-compound (B) copolymer.

The hybrid structure can be formed by any of known methods. One example of hybrid structure-forming methods is as follows. A reaction solution containing the compound (A) and the compound (B) is applied to a porous supporting layer. The excess of the reaction solution is removed, and then heat treatment may be carried out for the purpose of condensing hydrolyzable groups. As the method for polymerizing ethylenic unsaturated groups in the compound (A) and the compound (B), heat treatment, electromagnetic-wave irradiation, electron-beam irradiation or plasma irradiation may be adopted. For the purpose of increasing the polymerization speed, a polymerization initiator, a polymerization accelerator and the like can be added at the occasion of forming the separation functional layer.

Additionally, regarding any of the separation functional layers, the membrane surface thereof, before being used, may be rendered hydrophilic e.g. by an aqueous solution containing alcohol, an alkaline aqueous solution or the like.

(2-2-3) Porous Supporting Layer

The following configuration is applicable to a separation functional layer in a case where a separation function and a supporting function are realized in one layer (see FIG. 4), and to a porous supporting layer in a case where a separation function and a supporting function are realized in different layers (see FIG. 3).

The porous supporting layer 12 has no particular restrictions on materials used therein and shape thereof. For example, the porous supporting layer may be formed on a substrate through the use of a porous resin. In forming the porous supporting layer, polysulfone, cellulose acetate, polyvinyl chloride, epoxy resin, or a mixture or a laminate thereof can be used. Among them, polysulfone is preferably used in view of high chemical, mechanical and thermal stability and easiness of pore-size control.

The porous supporting layer imparts mechanical strength to the separation membrane, and unlike the separation membrane it has no separation function for components having small molecular size, such as ions. There are no particular limitation to sizes and size distribution of pores of the porous supporting layer. For example, the porous supporting layer may have uniform fine pores, or it may have such a size distribution that pores gradually increase in size from the surface on the side where the separation functional layer is formed to the other face. In either case, the projected area diameter of fine pores present at the surface on the side where the separation functional layer is formed is preferably 1 to 100 nm as determined through the use of an atomic force microscope or an electron microscope. In view of interfacial polymerization reactivity and retention of the separation functional layer in particular, it is preferable that the pores present at the surface of the porous supporting layer on the side where the separation functional layer is formed have projected area diameters ranging 3 to 50 nm.

The thickness of the porous supporting layer has no particular limits, but on the ground that it should impart strength to the separation membrane, it is preferable that the thickness of the porous supporting layer is within a range of 20 to 500 μm, more preferably 30 to 300 μm.

The configuration of the porous supporting layer can be observed under a scanning electron microscope, a transmission electron microscope or an atomic force microscope. For instance, when the observation is made with a scanning electron microscope, a sample for cross-section observations is made by peeling off the porous supporting layer from the substrate, and cutting the peeled-off layer in accordance with a freeze fracture method. This sample is coated with a thin film of platinum, platinum-palladium or ruthenium tetrachloride, preferably ruthenium tetrachloride, and observed with an ultrahigh-resolution field-emission scanning electron microscope (UHR-FE-SEM) under an acceleration voltage of 3 to 6 kV. As the ultrahigh-resolution field-emission scanning electron microscope, it is possible to use e.g. an electron microscope Model S-900 made by Hitachi Ltd. On the basis of electron micrographs obtained in such a manner, the thickness of the porous supporting layer and the projected area diameters of pores at the surface of the porous supporting layer can be determined.

The thickness and pore diameter of the porous supporting layer are represented as their respective average values. Specifically, the thickness of the porous supporting layer is an average value obtained by making thickness measurements at 20 points chosen at intervals of 20 μm in the direction orthogonal to the thickness direction in cross-section observation and averaging out the measurement values. And the pore diameter is an average value obtained by making projected area diameter measurements on 200 pores and averaging out the measurement values.

Then a method for forming the porous supporting layer is described. The porous supporting layer can be formed e.g. by casting a N,N-dimethylformamide (hereinafter abbreviated as DMF) solution of polysulfone as mentioned above in a uniform thickness onto a substrate as mentioned below, such as a tightly woven polyester fabric or a nonwoven fabric, and subjecting the cast solution to wet coagulation in water.

The porous supporting layer can be formed in accordance with the method described in "Office of Saline Water Research and Development Progress Report", No. 359 (1968). Therein, suitable adjustments to the polymer concentration, the solvent temperature and the poor solvent can be made in order to obtain the desired configuration.

For instance, the porous supporting layer can be obtained by taking the following steps. A predetermined concentration of polysulfone resin solution is prepared by dissolving a predetermined amount of polysulfone in DMF, and an almost uniform coat of the thus prepared polysulfone resin solution is applied to a substrate of a polyester fabric or a nonwoven fabric, then left standing in the air for a certain length of time to remove the solvent on the surface, and further immersed in a coagulating solution to coagulate the polysulfone.

(2-2-4) Substrate

As the substrate 11, a fibrous substrate is preferably used from in view of strength, ability to form asperities and fluid permeability. Both a long-fiber nonwoven fabric and a short-fiber nonwoven fabric can be suitably used as the fibrous substrate. The long-fiber nonwoven fabric in particular has an excellent membrane-forming property, and therefore prevents the possibilities that, when a polymer solution is flow-cast onto the fabric, the solution may permeate to the backside of the fabric and the porous supporting layer may peel off because of overpermeation of the solution, and further can inhibit the membrane formed thereon from becoming nonuniform owing to fluffiness of the substrate and defects including pinholes and the like. In addition, the case of using as the substrate a long-fiber nonwoven fabric made up of thermoplastic long fibers can reduce unevenness caused by fluffiness of fibers and membrane defects produced at the time of flow-cast of a polymer solution as compared with the case of using a short-fiber nonwoven fabric. Further, when the separation membrane is formed continuously, tension is applied to the direction in which a membrane is being formed. Therefore, it is appropriate to use a long-fiber nonwoven fabric superior in dimensional stability.

In terms of formability and strength, it is advantageous for fibers of a long-fiber nonwoven fabric to be longitudinally oriented more in the surface layer on the side opposite to the porous supporting layer side than in the surface layer on the porous supporting layer side. Having such a configuration is advantageous because it allows not only retention of strength, thereby achieving high effect on prevention of membrane failure and the like, but also improvement in ability to form into a laminate including a porous supporting layer and a substrate at the occasion of giving asperities to a separation membrane, thereby stabilizing an uneven surface profile of the separation membrane.

More specifically, in the long-fiber nonwoven fabric, the degree of fiber orientation in the surface layer on the side opposite to the porous supporting layer side is preferably from 0° to 25°. In addition, the difference in the degree of fiber orientation between the surface layer on the side opposite to the porous supporting layer side and that on the porous supporting layer side is preferably from 10° to 90°.

In a process of making a separation membrane and in a process of making a membrane element, heating steps are included. And there occurs a phenomenon in which a porous supporting layer or a separation functional layer shrinks when heated. This phenomenon is remarkable in the width direction in particular to which no tension is applied in continued membrane formation. The shrinkage causes a problem in dimensional stability or the like, and it is therefore preferred that the substrate is low in rate of dimensional change by heat. Cases where the difference in degree of fiber orientation in a nonwoven fabric between the surface layer on the side opposite to the porous supporting layer side and the surface layer on the porous supporting layer side is in a range of 10° to 90° are preferred because they can also inhibit thermal changes in the direction of the width.

The term "degree of fiber orientation" used in this description refers to the index indicating orientations of fibers in a nonwoven fabric substrate incorporated in the porous supporting layer. In the concrete, the degree of fiber orientation is an average value of angles between fibers constituting nonwoven fabric substrate and the direction of travel in continued membrane formation, namely the length direction of a nonwoven fabric substrate. More specifically, when the length directions of fibers are parallel to the direction of travel in membrane formation, the degree of fiber orientation is 0°. On the other hand, when the length directions of fibers are orthogonal to the direction of travel in membrane formation, or parallel to the width direction of a nonwoven fabric substrate, the degree of fiber orientation is 90°. Thus the degree of fiber orientation nearer to 0° indicates that the directions of fibers are the nearer to the longitudinal direction, and the degree of fiber orientation nearer to 90° indicates that the directions of fibers are the nearer to the lateral direction.

The degree of fiber orientation is determined in the following manner. To begin with, 10 small sample pieces are randomly taken from a piece of nonwoven fabric. Then, photographs of surfaces of these pieces are taken under a scanning electron microscope set at a magnification of 100 to 1,000 times. From the photographs taken, 10 fibers per sample piece are chosen and an angle which each fiber forms with the length direction of the nonwoven fabric is measured, with the length direction of nonwoven fabric (also referred to as the longitudinal direction, or the direction of travel in membrane formation) being taken as 0°. In other words, angle measurements are made on 100 fibers per piece of nonwoven fabric. The average value of the angles thus measured on the 100 fibers is calculated. The value obtained by rounding off the thus calculated average value to the first decimal place is defined as the degree of fiber orientation.

It is appropriate to adjust the substrate thickness so that the sum total of substrate thickness and porous supporting layer thickness falls within a range of 30 to 300 μm, preferably 50 to 250 μm.

(2-3) Permeate-Side Channel Member

As shown in FIG. 2, the permeate-side channel member (hereinafter simply referred to as "channel member") 4 is fixed to the permeate-side face 18 of the separation membrane main body 30. Specifically, the permeate-side channel member 4 is arranged so as to form a permeate-side flow channel 15. The expression of "arranged so as to form a permeate-side flow channel" means that the channel member is configured so that a permeated fluid having permeated through the separation membrane main body can arrive at a water collection tube when the separation membrane is incorporated into a separation membrane element described hereinafter.

In the present invention, it is important that the permeate-side channel member includes a composition containing at least a high-crystalline polypropylene (A) and satisfies the following requirements (a) and (b).

(a) a content of the high-crystalline polypropylene (A) in the composition is from 40 to 95% by weight;

(b) the permeate-side channel member has a melting endothermic energy amount ($\Delta H$) of from 20 to 70 J/g.

When the content of the high-crystalline polypropylene (A) in the composition is 95% by weight or less, the separation membrane having the permeate-side channel formed thereon can be prevented from curling. Accordingly, the handleability of the separation membrane is thereby improved and, for example, the passage in the process of laminating the envelop-like film in one step of the method for producing a separation membrane element can be remarkably improved. More preferably, the content of the high-crystalline polypropylene (A) is 85% by weight or less, even more preferably 75% by weight or less.

On the other hand, when the content of the high-crystalline polypropylene (A) in the composition is 40% by weight or less, not only the curling resistance of the separation membrane can be improved but also other advantages are realized in that, for example, even when the separation membrane element of the present invention is operated under a high-pressure condition such as more than 2 MPa, the compression deformation of the permeate-side channel member can be prevented and, as a result, the separation membrane element performance (especially water production performance) can be prevented from being worsened and the separation membrane element can therefore exhibit stable performance. From the viewpoint of reducing compression deformation, the content of the high-crystalline polypropylene (A) is more preferably 45% by weight or more, even more preferably 50% by weight or more.

Examples of the high-crystalline polypropylene (A) in the present invention include a propylene homopolymer; a propylene random copolymer; and a propylene block copolymer. These polymers may be used alone or as mixtures of any two or more thereof. The melting point of the high-crystalline polypropylene (A) is preferably 140° C. or higher, more preferably 150° C. or higher. The melting point is a value to be measured with a differential scanning calorimeter (DSC), and the details of the measurement method thereof are described below.

Further, the melt flow rate (MFR) of the high-crystalline polypropylene (A) is preferably from 10 to 2000 g/10 min. Controlling MFR to fall within such a range facilitates melt molding of the permeate-side channel member. In addition, the melt molding temperature can be set low and, as a result, the separation membrane main body can be prevented from being damaged by heat during melt molding or the performance thereof can be prevented from worsening, and further, the channel member can be favorably fixed to the permeate-side face of the separation membrane main body. More preferably, MFR of the high-crystalline polypropylene (A) is from 30 to 1800 g/10 min, even more preferably from 50 to 1500 g/10 min. The details of the measurement method of MFR are described below.

In the present invention, it is important that the melting endothermic energy amount ($\Delta H$) of the permeate-side channel member is from 20 to 70 J/g. When $\Delta H$ of the permeate-side channel member is less than 20 J/g, the separation membrane can be sufficiently prevented from curling, but on the other hand, the crystallization of the composition constituting the permeate-side channel member is extremely slow and therefore the permeate-side channel member would be sticky. As a result, in roll conveyance, the permeate-side channel member would adhere to rolls or would deform owing to contact with rolls. Further, in winding up with a winder and in unwinding, there may occur other problems in that the permeate-side channel member adheres to the side of the separation functional layer of the separation membrane and therefore it becomes extremely difficult to unroll the rolled separation membrane and the handleability of the separation membrane is thereby greatly worsened. Further, the compression deformation in operation under pressure becomes large.

On the other hand, when $\Delta H$ of the permeate-side channel member is larger than 70 J/g, the crystallization of the composition constituting the permeate-side channel member is rapid and therefore, when the permeate-side channel is formed, the volume change in cooling and solidification of the composition becomes extremely large and, as a result, the separation membrane may curl greatly. Further, the permeate-side channel member may be extremely brittle and the permeate-side channel member may be broken during roll conveyance.

$\Delta H$ of the permeate-side channel member is more preferably 25 to 65 J/g, even more preferably 30 to 60 J/g. The melting endothermic energy amount is a numerical value to be measured with a differential scanning calorimeter (DSC), and the details of the measurement method thereof are described below.

In the present invention, the composition constituting the permeate-side channel member preferably contains a low-crystalline $\alpha$-olefin polymer (B), and the content thereof in the composition is preferably from 5 to 60% by weight.

The low-crystalline $\alpha$-olefin polymer in the present invention is an amorphous or low-crystalline $\alpha$-olefin polymer, and examples thereof include (B-1) a low-crystalline polypropylene such as atactic polypropylene, isotactic polypropylene having low stereoregularity, etc.; (B-2) an ethylene/$\alpha$-olefin copolymer of ethylene and an $\alpha$-olefin selected from those having 3 to 20 carbon atoms (examples of the $\alpha$-olefin having 3 to 20 carbon atoms include a linear or branched $\alpha$-olefin, and specifically examples of the linear $\alpha$-olefin include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, and 1-eicosene, and examples of the branched $\alpha$-olefin includes 3-methyl-1-butene, 3-methyl-1-pentene, 4-methyl-1-pentene, 2-ethyl-1-hexene, and 2,2,4-trimethyl-1-pentene); (B-3) as commercial products, propylene/olefin copolymers such as "Tafmer" manufactured by Mitsui Chemical, "Tafcelene" manufactured by Sumitomo Chemical, etc. In the present invention, one or more of these may be used. Above all, as the low-crystalline $\alpha$-olefin polymer (B), low-crystalline polypropylenes (B-1) and propylene/olefin copolymers (B-3) are more preferred from the viewpoint of good compatibility with high-crystalline polypropylene and general versatility and from the viewpoint of the effect of preventing the separation membrane from curling.

In the present invention, the content of the low-crystalline $\alpha$-olefin polymer (B) is preferably from 5 to 60% by weight relative to the composition constituting the permeate-side channel member. When the content of the low-crystalline $\alpha$-olefin polymer (B) is 5% by weight or more, the permeate-side channel member can be flexible and the crystallization rate of the high-crystalline polypropylene (A) can be delayed and, as a result, the separation membrane can be thereby prevented from curling. On the other hand, when the content of the low-crystalline $\alpha$-olefin polymer (B) is more than 60% by weight, the curling resistance of the separation membrane can be significantly improved, but the flexibility of permeate-side channel member becomes extremely high and, for example, when operated under a pressure condition of more than 2 MPa, the compression deformation of the permeate-side channel member would increase and, as a result, owing to channel obstruction, the separation membrane element performance (especially water production performance) would greatly lower. The content of the low-crystalline $\alpha$-olefin polymer (B) is, from the viewpoint of the flexibility of the permeate-side channel member and the compression deformation thereof under pressure, more preferably from 10 to 55% by weight, even more preferably from 15 to 50% by weight.

In the present invention, the channel member fixed to the permeate-side face of the separation membrane main body may contain one or more additives such as a thermal flowability improver, a filler, an antioxidant, a lubricant and the like within a range not impairing the object of the present invention.

Examples of the thermal flowability improver (C) include, though not limited thereto, (C-1) synthetic wax such as polyethylene wax, polypropylene wax, atactic polypropylene wax, Fischer-Tropsch wax, etc.; (C-2) petroleum wax such as paraffin wax, microcrystalline wax, etc.; (C-3) natural wax such as carnauba wax, bees wax, etc.; (C-4) rosin resin such as rosin, hydrogenated rosin, polymerized rosin, rosin ester, etc.; (C-5) terpene resin such as terpene, hydrogenated terpene, aromatic-modified terpene, aromatic-modified hydrogenated terpene, etc.; (C-6) hydrogenated petroleum resin such as "I-MARV" (trade name) manufactured by Idemitsu Kosan, "Arkon" (trade name) manufactured by Arakawa Chemical Industry, "Petcoal" and "Petrotack" (both trade names) manufactured by Tosoh Corporation, etc. They can be used alone or as mixtures of any two or more thereof. Among these, the synthetic wax (C-1), the terpene resin (C-5) and the hydrogenated petroleum resin (C-6) are preferred from the viewpoint of the effect of improving the thermal flowability of the composition, the compatibility with the high-crystalline polypropylene (A) and the thermal decomposition resistance of the composition in melting under heat. The content thereof may be suitably set for controlling the melt viscosity of the composition constituting the permeate-side channel member, but in consideration of preventing the pressure resistance of the permeate-side channel member from lowering and preventing the additive from bleeding out on the surface of the channel member, the content thereof is preferably 50% by weight or less in the composition, more preferably 40% by weight or less.

Examples of the antioxidant (D) include, though not limited thereto, a phenolic compound, a phosphorus compound, a hindered amine compound, and a sulfur compound. They can be used alone or as mixtures of any two or more thereof. From the viewpoint of preventing thermal decomposition of the composition in molding into the permeate-side channel member, the content thereof is preferably 0.001 to 1% by weight relative to the composition.

Examples of the lubricant (E) include, though not limited thereto, fatty acid amide compounds such as stearamide, oleic amide, erucamide, and ethylenebis-stearamide; metal soaps such as calcium stearate, zinc stearate, magnesium stearate, and zinc stearate; and fatty acid ester compounds. They can be used alone or as mixtures of any two or more thereof.

Examples of the filler (F) include, though not limited thereto, inorganic compounds such as calcium carbonate, talc, alumina, silica, mica, and clay. They can be used alone or as mixtures of any two or more thereof. From the viewpoint of the moldability into the permeate-side channel member, the viscosity increase of the composition and the abrasion resistance of processing devices, the content thereof is preferably 3 to 30% by weight relative to the composition.

In the present invention, the tensile elongation of the permeate-side channel member fixed to the permeate-side face of the separation membrane main body is preferably 5% or more. When the tensile elongation is 5% or more, the channel member may be prevented from being damaged or broken when the separation membrane is conveyed on rolls or wound around a winder, and therefore a high-quality separation membrane can be obtained. In addition, in the element production process, the handleability of the membrane is good. More preferably, the tensile elongation of the permeate-side channel member is 7% or more, even more preferably 10% or more. When the tensile elongation is higher, the energy needed for breakage is higher, and a high tensile elongation is preferred from the viewpoint of toughness; however, when it is too high, the deformation of the membrane under a constant stress may increase. Consequently, the tensile elongation of the permeate-side channel member is preferably 300% or less, more preferably 200% or less.

In the present invention, the tensile elasticity of the permeate-side channel member fixed to the permeate-side face of the separation membrane main body is preferably 0.2 to 2.0 GPa. When the tensile elasticity is 0.2 GPa or more, the compression deformation of the channel member can be prevented even when the separation membrane element is operated under a pressure condition of more than 2.0 MPa, and as a result, the water production performance may be prevented from being worsened. The tensile elasticity is more preferably 0.25 GPa or more, even more preferably 0.30 GPa or more. When the tensile elasticity is higher, the compression deformation of the channel member in operation under pressure can be reduced more, but substantially it is difficult to attain a tensile elasticity of 2.0 GPa or more.

The shape of the permeate-side channel member may be a continuous one or a discontinuous one. The "continuous" channel member is a channel member that is peeled from one separation membrane main body as one member not divided into plural sections. For example, a member of net, tricot (knitted fabric), film or the like is a continuous channel member.

As opposed to the above, "discontinuous" means that, when the channel member is peeled from the separation membrane main body, the channel member is divided into plural sections. All the individual parts divided on one separation membrane main body and the entire channel member formed on one separation membrane main body may be conveniently referred to as "channel member".

For example, in a case where a knitted fabric such as tricot is used as the channel member, the height of the flow channel is smaller than the thickness of the knitted fabric. As opposed to this, the thickness of a discontinuous channel member is entirely utilized as the height of the flow channel, and therefore the flow resistance of the discontinuous channel member can be reduced as compared to that of the continuous channel member, and as a result, the water production amount can be increased.

FIG. 5 to FIG. 8 show examples of a discontinuous channel member.

Figure 5:
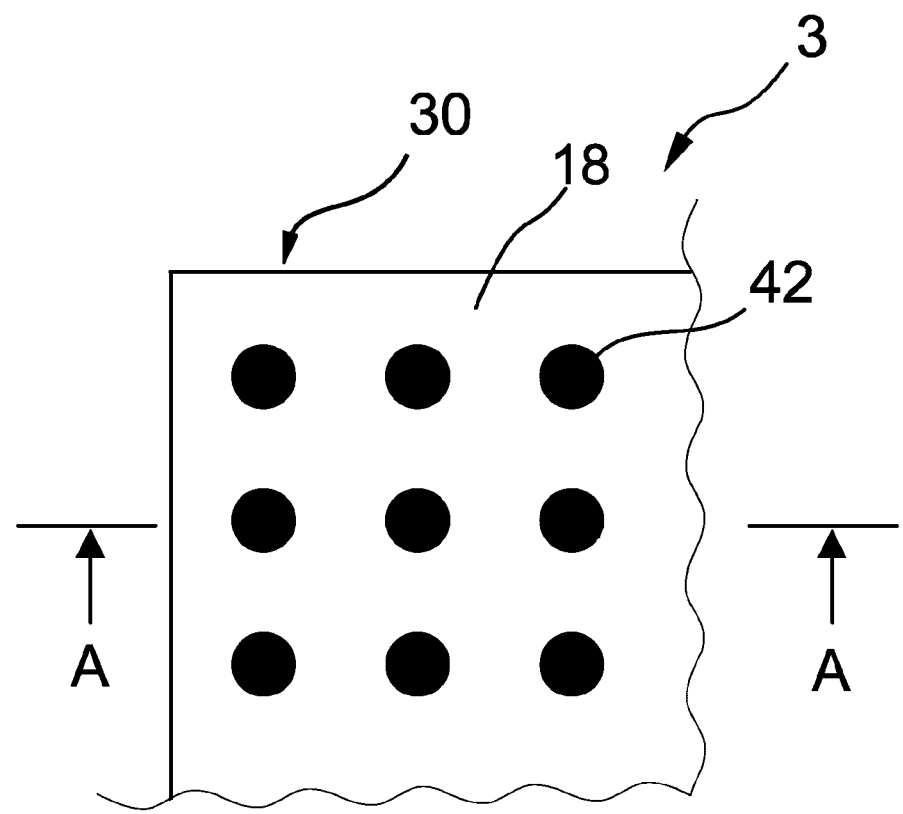
FIG. 5 is a plan view showing one example of a separation membrane including a permeate-side channel member.
Figure 6:
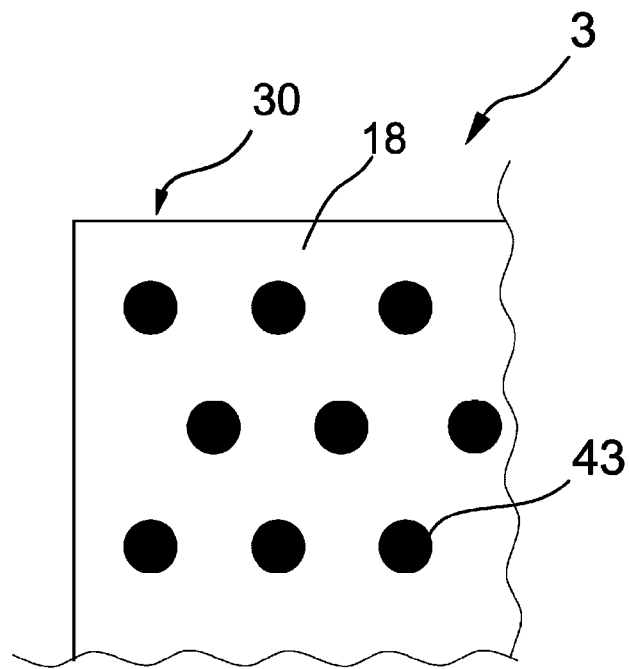
FIG. 6 is a plan view showing another example of a separation membrane including a permeate-side channel member.
Figure 10:
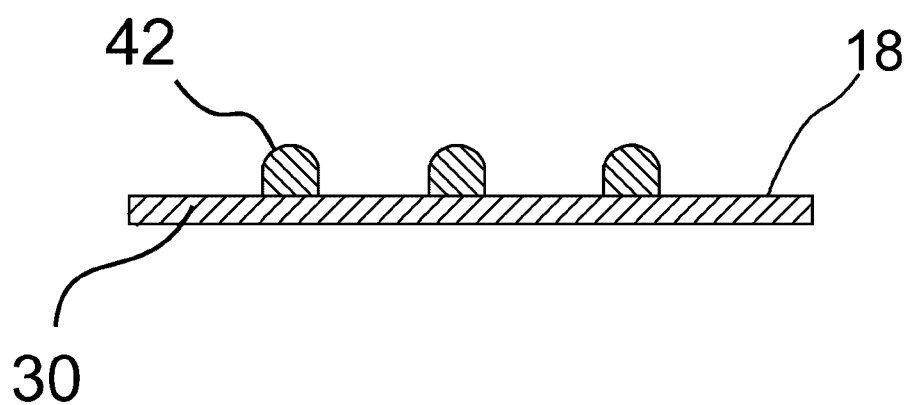
FIG. 10 is a cross-sectional view of the separation membrane viewing from the arrow direction of the A-A line in FIG. 5.

As shown in FIG. 5 and FIG. 10, the channel members 42 are columnar members whose tops are nearly semispherical, and are arranged in a lattice-like pattern on the separation membrane main body 30. The individual channel members 43 shown in FIG. 6 each have the same shape as that of the channel members 42 shown in FIG. 5, but in FIG. 6, the channel members 43 are arranged in zigzag.

Figure 7:
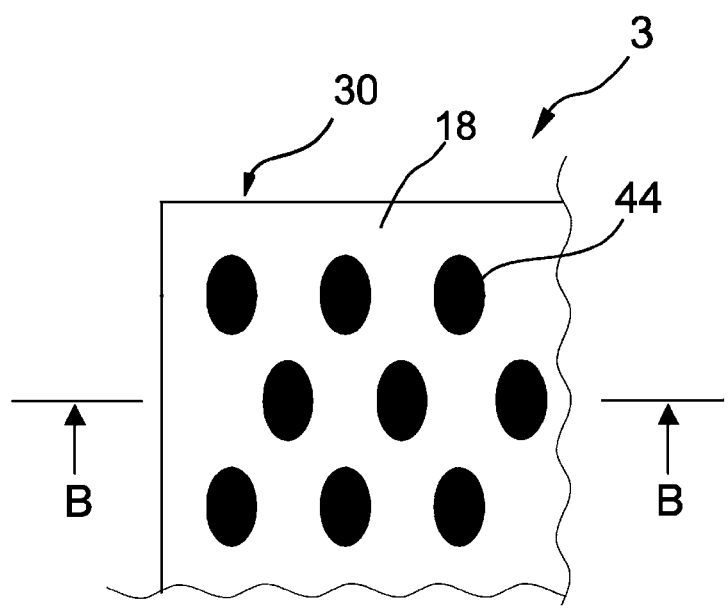
FIG. 7 is a plan view showing still another example of a separation membrane including a permeate-side channel member.
Figure 11:
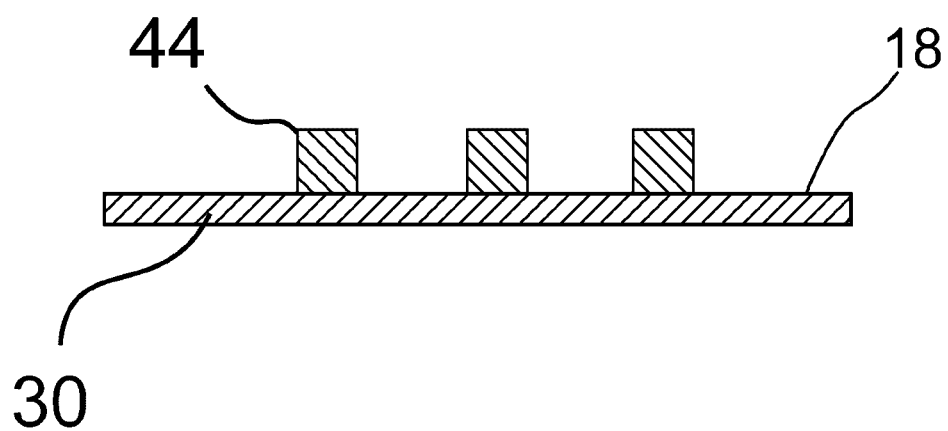
FIG. 11 is a cross-sectional view of the separation membrane viewing from the arrow direction of the B-B line in FIG. 7.

As shown in FIG. 7, the channel members 44 are columnar members whose plane view is oval, and are arranged in zigzag on the separation membrane main body 30. As shown in FIG. 11, the top of the channel member 44 is flat, and the shape of the cross section thereof is rectangular.

Figure 8:
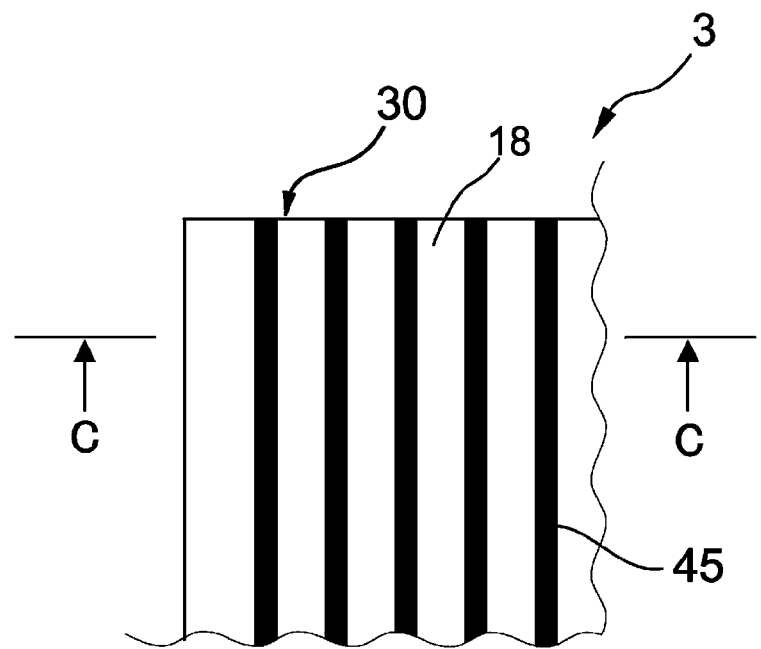
FIG. 8 is a plan view showing still another example of a separation membrane including a permeate-side channel member.
Figure 12:
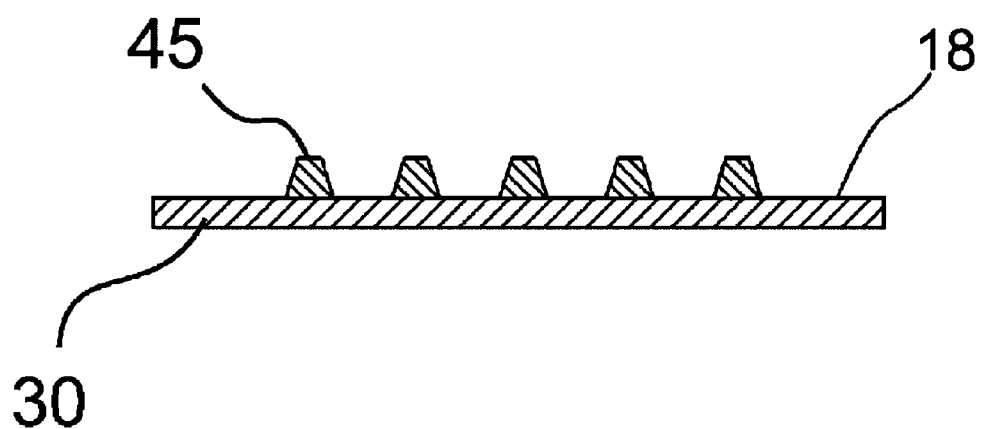
FIG. 12 is a cross-sectional view of the separation membrane viewing from the arrow direction of the C-C line in FIG. 8.

As shown in FIG. 8, the channel members 45 are linear wall-like members as the plane shape thereof. The wall-like members are arranged in parallel to each other. As shown in FIG. 12, the cross section of the channel member 45 on the plane surface vertical to the membrane surface of the separation membrane main body is a trapezoidal one in which the upper width is narrower than the lower width.

Figure 9:
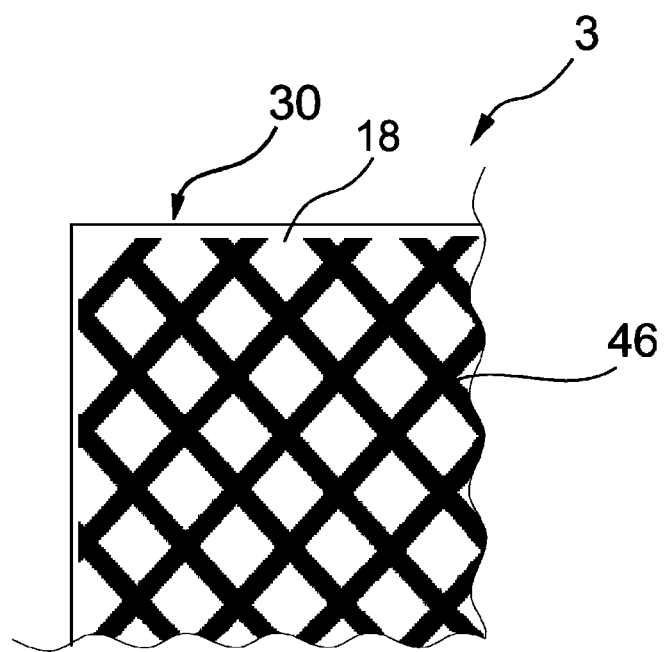
FIG. 9 is a plan view showing still another example of a separation membrane including a permeate-side channel member.

FIG. 9 shows an example of a continuous channel member. As shown in FIG. 9, the channel member 46 is a net-like member that continues in the membrane surface direction of the separation membrane main body 30. In this case, the height of the part at which the channel members intersect with each other corresponds to the thickness of the channel member, and is larger than the thickness of the non-intersecting part.

In any of the channel members shown in FIG. 5 to FIG. 9, the shape of the cross section may be changed to the shape of the cross section shown in FIG. 10 to FIG. 12. In other words, the shape of the plane and the shape of the cross section of channel members and also the arrangement thereof that are described as different configurations may be combined with each other. In that manner, for the channel members, any of the plane shapes of FIG. 5 to FIG. 9 may be combined in any desired manner with any of the cross-sectional shapes of FIG. 10 to FIG. 12, and the resultant variations are within the scope of the embodiments of the present invention.

The channel member fixed to the permeate-side face of the separation membrane main body is so arranged that it may continue from the inner end of the sheet to the outer end thereof in the winding direction. The inner side in the winding direction is the side nearer to the water collection tube in the separation membrane main body, and the outer side in the winding direction is the side distant to the water collection tube in the separation membrane main body. Preferably, the channel member is arranged to be vertical to the lengthwise direction of the water collection tube.

From the viewpoint of preventing sinking of the membrane between plural channel members during operation under pressure using the separation membrane element, the spacing between the neighboring channel members is preferably 0.05 to 5.00 mm, more preferably 0.10 to 2.00 mm, and it is desirable that the separation membrane element is designed within the range. The spacing between the channel members means the horizontal distance between the highest part of the channel members differing in height and the highest part of other channel members adjacent to the foregoing channel members.

The height difference on the permeate-side of the separation membrane, that is, the thickness of the permeate-side channel member is preferably 50 to 500 μm, more preferably 75 to 450 μm, even more preferably 100 to 400 μm. When the thickness of the channel member is 500 μm or less, the number of the membrane leaves capable of being loaded in one vessel can be increased. When the thickness of the channel member is 50 μm or more, the flowing resistance of fluid can be relatively reduced and therefore good separation performance and permeation performance can be attained.

The height difference on permeate-side of the separation membrane may be measured from a cross-cut sample using Keyence's Digital Microscope "VHX-1000" (trade name). Some points differing in height are measured, and the values of the thickness are summed up, and the resultant value is divided by the total number of the measurement points.

Regarding the configuration of the separation membrane, the channel members may be formed to the edge of the separation membrane main body, or the membrane may have some area with no channel member formed around the edge thereof. In other words, so far as the channel members are so arranged as to form flow channels on the permeate-side, the separation membrane main body may have any space with no channel members formed therein. For example, it is unnecessary to form channel members in the adhesion area in the permeate-side face to be adhered to other separation membranes. For any other reasons in use or in production, the separation membrane may have a region with no channel members formed thereon, for example, partly around the edge thereof.

(2-4) Sheet Channel Member to which Projections are Fixed

Figure 13:
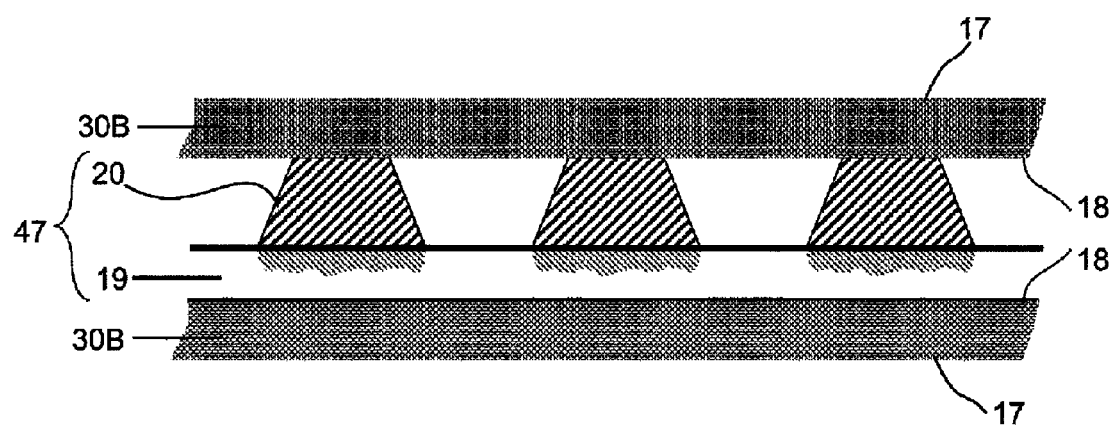
FIG. 13 is a cross-sectional view showing one example of a sheet channel member in which projections are fixed onto a sheet.

In the present invention, a sheet having projections fixed thereto may be employed as a permeate-side channel member. As shown in FIG. 13, the sheet channel member 47 in which projections 20 are fixed onto a sheet 19 is arranged between the permeate-side faces of two separation membrane main bodies 30B as a permeate-side channel member therebetween.

In the case of the sheet channel member 47 in which the projections 20 are fixed to the sheet 19, even when the neighboring projections bond to each other owing to position accuracy failure or working malfunction in forming projections on a sheet to clog the permeated water flow channel (groove between projections), the inside area of the sheet could be a flow channel and therefore the permeated water can move to a different groove via the sheet. Further, since projections are formed on a sheet, the performance of the separation membrane itself does not degrade in forming the projections.

The sheet may be a fibrous substrate, a porous film or the like, but from the viewpoint of strength and water permeation, a fibrous substrate is preferably used.

As the fibrous substrate, any of a long-fiber nonwoven fabric or a short-fiber nonwoven fabric is preferred, and from the viewpoint of adhesiveness of projections to the sheet, penetrability of adhesive to the sheet in sealing up the permeate-side faces of two separation membranes, and prevention of breakage of sheet in sheet conveyance, preferably, the thickness of the fibrous substrate is within a range of 20 to 150 μm, and the unit weight thereof is within a range of 20 to 100 g/m².

In the present invention, it is important that the melting endothermic energy amount (ΔH) of the projections fixed to the sheet is from 20 to 70 J/g. When ΔH of the projections is smaller than 20 J/g, the sheet having the projections fixed thereto can be satisfactorily prevented from curling, but on the other hand, the crystallization of the composition constituting the projections is extremely slow and therefore the projections become sticky. As a result, during roll conveyance, the projections may adhere to rolls, or the projections may deform owing to contact thereof with rolls. Further, in winding up with a winder and in unwinding, the projections may adhere to the sheet (on the side not having projections), that is, the windability of the sheet roll having the projections fixed thereto significantly worsens and, as a result, the handleability of the separation membrane greatly worsens. In addition, when the separation membrane is operated under pressure as an element containing it, the compression deformation of the projections becomes large and the element performance is thereby worsened.

On the other hand, when ΔH of the projections is larger than 70 J/g, the crystallization of the composition constituting the projections fixed to the sheet is rapid, and therefore, in forming the projections, the volume change in cooling and solidification of the composition becomes extremely large and, as a result, the sheet having the projections fixed thereto may curl greatly. Further, the projections may be extremely brittle and in roll conveyance of the sheet having the projections fixed thereto, the projections may be broken and starting from the broken parts thereof, the projections may peel off from the sheet.

More preferably, ΔH of the projections is from 25 to 65 J/g, even more preferably from 30 to 60 J/g. The melting endothermic energy amount is a numerical value measured with a differential scanning calorimeter (DSC), and the details of the measurement method thereof are described below.

In the present invention, the composition constituting the projections preferably contains a low-crystalline α-olefin polymer (B), and the content thereof in the composition is preferably 5 to 60% by weight.

Examples of the low-crystalline α-olefin polymer include the above-mentioned (B-1) low-crystalline polypropylene, (B-2) ethylene/α-olefin copolymer, and (B-3) propylene/olefin copolymer. In the present invention, one or more of these may be used. Above all as the low-crystalline α-olefin polymer (B), the low-crystalline polypropylene (B-1) and the propylene/olefin copolymer (B-3) are more preferred from the viewpoint of good compatibility with high-crystalline polypropylene, versatility and from the viewpoint of the effect of preventing the sheet channel member from curling.

In the present invention, the content of the low-crystalline α-olefin polymer (B) is preferably from 5 to 60% by weight relative to the composition constituting the projections. When the content of the low-crystalline α-olefin polymer (B) is 5% by weight or more, the projections can be flexible and the crystallization rate of the high-crystalline polypropylene (A) can be delayed, and as a result, the sheet channel member can be prevented from curling. On the other hand, when the content of the low-crystalline α-olefin polymer (B) is more than 60% by weight, the sheet channel member can be significantly prevented from curling, but the flexibility of the projections becomes extremely high and, for example, when operated under a pressure condition of more than 2 MPa, the compression deformation of the projections would increase and, as a result, the permeate-side channel would be clogged so that the separation membrane element performance (especially water production performance) would greatly lower. The content of the low-crystalline α-olefin polymer (B) is, from the viewpoint of flexibility of projections and compression deformation under pressure, more preferably from 10 to 55% by weight, even more preferably from 15 to 50% by weight.

In the present invention, the sheet channel member may contain one or more additives such as a thermal flowability improver, a filler, an antioxidant, a lubricant and the like within a range not impairing the object of the present invention.

Examples of the thermal flowability improver (C) include, though not limited thereto, the above-mentioned (C-1) synthetic wax, (C-2) petroleum wax, (C-3) natural wax, (C-4) rosin resin, (C-5) terpene resin, and (C-6) hydrogenated petroleum resin. They can be used alone or as mixtures of any two or more thereof. Among these, the synthetic wax (C-1), the terpene resin (C-5) and the hydrogenated petroleum resin (C-6) are preferred from the viewpoint of the effect of improving the thermal flowability of the composition, the compatibility with the high-crystalline polypropylene (A) and the thermal decomposition resistance of the composition in melting under heat.

The content thereof may be suitably set for controlling the melt viscosity of the composition constituting the projections, but in consideration of preventing the pressure resistance of the projections from lowering and preventing the additive from bleeding out on the surfaces of the projections, the content thereof is preferably 50% by weight or less in the composition, more preferably 40% by weight or less.

Examples of the antioxidant (D) include, though not limited thereto, the above-mentioned phenolic compound, phosphorus compound, hindered amine compound, and sulfur compound. They can be used alone or as mixtures of any two or more thereof. From the viewpoint of preventing thermal decomposition of the composition in fixing the projections to the sheet, the content thereof is preferably 0.001 to 1% by weight relative to the composition.

Examples of the lubricant (E) include, though not limited thereto, the above-mentioned fatty acid amide compounds, metal soaps, and fatty acid ester compounds. They can be used alone or as mixtures of any two or more thereof.

Examples of the filler (F) include, though not limited thereto, the above-mentioned inorganic compounds. They can be used alone or as mixtures of any two or more thereof. From the viewpoint of the moldability into projections, the viscosity increase of the composition and the abrasion resistance of processing devices, the content of the filler (F) is preferably 3 to 30% by weight relative to the composition.

In the present invention, the tensile elongation of projections fixed to the sheet is preferably 5% or more. When the tensile elongation is 5% or more, the projections may be prevented from being damaged or broken even when the sheet having the projections fixed thereto is conveyed on rolls or is wound around a winder, and therefore a high-quality sheet can be obtained. In addition, in the element production process, the handleability of the membrane is good. More preferably, the tensile elongation of projections is 7% or more, even more preferably 10% or more. When the tensile elongation is higher, the energy needed for breakage is higher, and a high tensile elongation is preferred from the viewpoint of toughness; however, when it is too high, the deformation under a constant stress may increase. Consequently, the tensile elongation of projections is preferably 300% or less, more preferably 200% or less.

In the present invention, the tensile elasticity of the projections fixed to the sheet is preferably 0.2 to 2.0 GPa. When the tensile elasticity is 0.2 GPa or more, the compression deformation of the projections can be prevented even when the separation membrane element is operated under a pressure condition of more than 2.0 MPa, and as a result, the water production performance may be prevented from being worsened. The tensile elasticity is more preferably 0.25 GPa or more, even more preferably 0.30 GPa or more. When the tensile elasticity is higher, the compression deformation of the channel member in operation under pressure can be reduced more, but substantially it is difficult to attain a tensile elasticity of 2.0 GPa or more.

The shape of projections fixed onto the sheet may be a continuous one or a discontinuous one. The "continuous" projections are projections that are peeled from one sheet as one shape not divided into plural sections. As opposed to this, "discontinuous" projections are those that are separated into plural sections when peeled off from the sheet.

For example, in a case of a channel member having continuous projections on a sheet, the height of the flow channel is smaller than the thickness of the continuous projections. As opposed to this, the thickness of the channel member having discontinuous projections formed thereon is entirely used as the height of the flow channel, and therefore, the flow resistance of the discontinuous channel member can be reduced as compared to that of the continuous channel member, and as a result, the water production amount can be increased.

FIG. 14 to FIG. 17 show examples of discontinuous projections.

Figure 14:
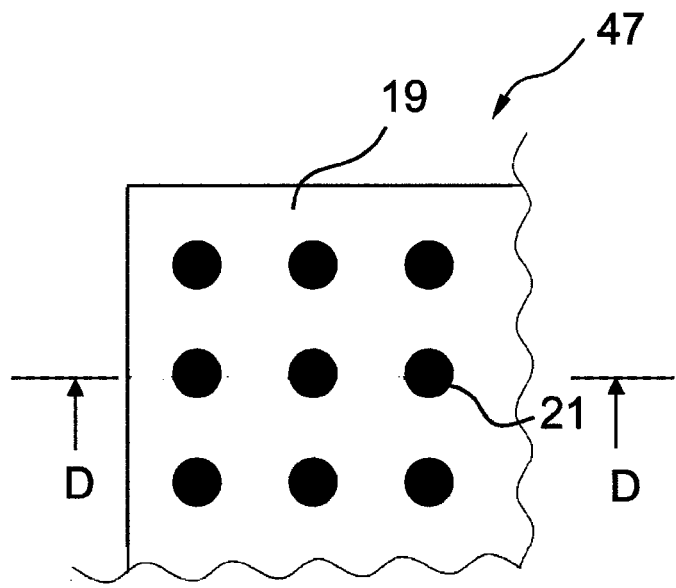
FIG. 14 is a plan view showing one example of a sheet channel member in which projections are fixed onto a sheet.
Figure 15:
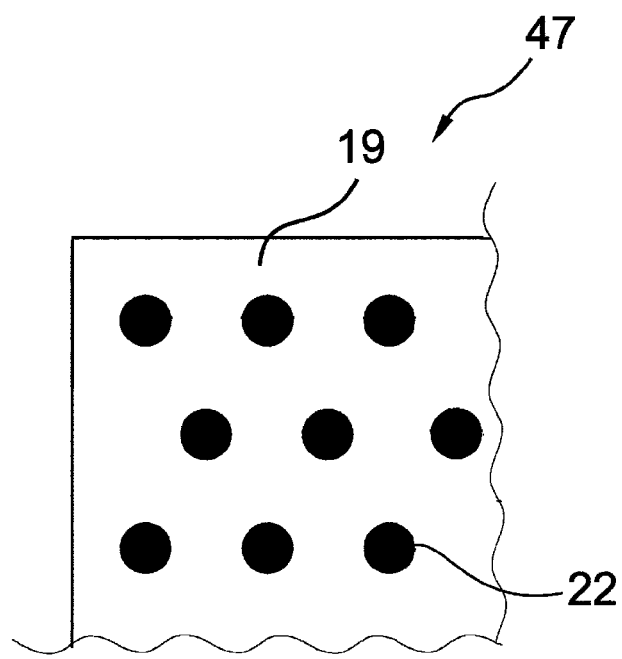
FIG. 15 is a plan view showing another example of a sheet channel member in which projections are fixed onto a sheet.
Figure 19:
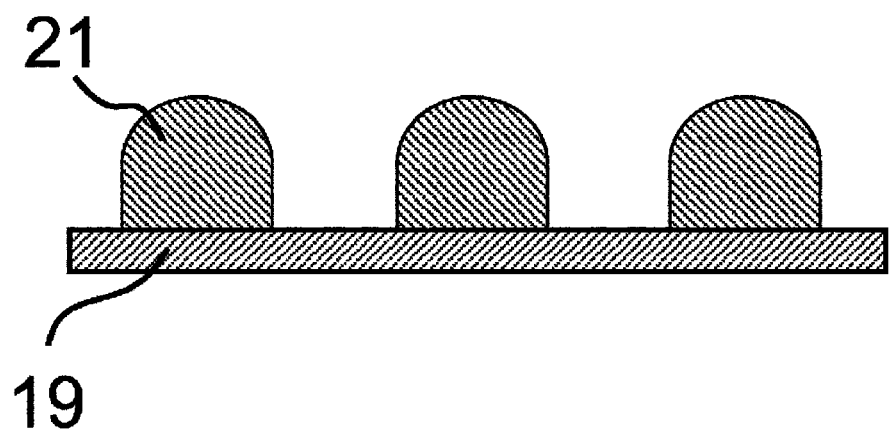
FIG. 19 is a cross-sectional view of the sheet channel member in which projections are fixed onto a sheet, viewing from the arrow direction of the D-D line in FIG. 14.

As shown in FIG. 14 and FIG. 19, the projections 21 are columnar members whose tops are nearly semispherical, and are arranged in a lattice-like pattern on the sheet 19. The individual projections 22 shown in FIG. 15 each have the same shape as that of the projections 21 shown in FIG. 14, but in FIG. 15, the projections 22 are arranged in zigzag.

Figure 16:
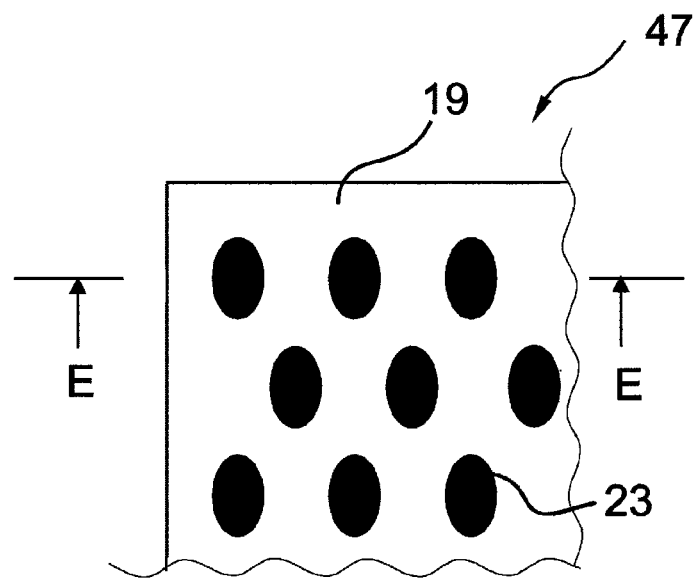
FIG. 16 is a plan view showing still another example of a sheet channel member in which projections are fixed onto a sheet.

As shown in FIG. 16, the projections 23 are oval columns, and are arranged in zigzag on the sheet 19. As in FIG. 20 showing the cross section thereof, the top of the projection 23 is flat, and the shape of the cross section thereof is rectangular.

Figure 17:
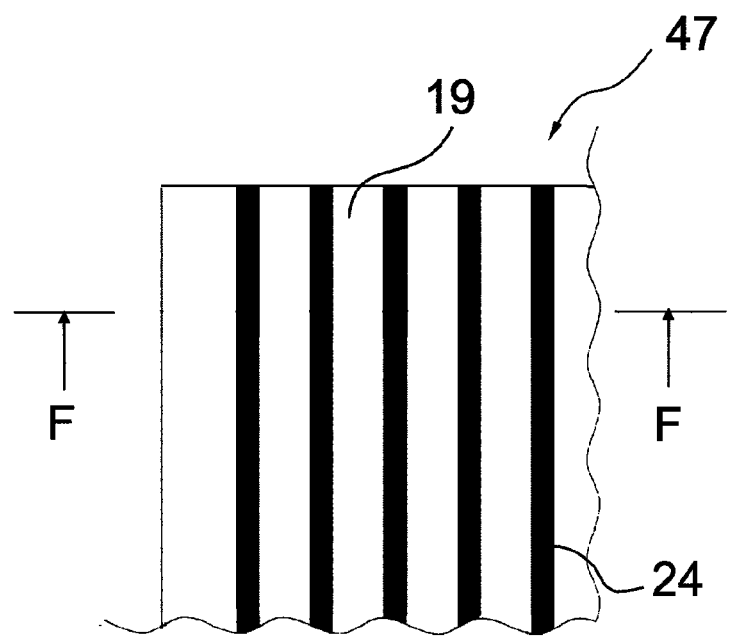
FIG. 17 is a plan view showing still another example of a sheet channel member in which projections are fixed onto a sheet.
Figure 21:
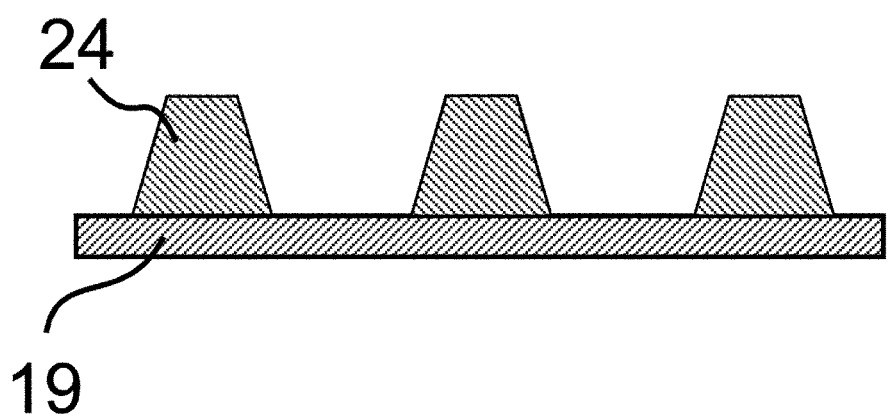
FIG. 21 is a cross-sectional view of the sheet channel member in which projections are fixed onto a sheet, viewing from the arrow direction of the F-F line in FIG. 17.

As shown in FIG. 17, the projections 24 are linear wall-like members as the plane shape thereof. The wall-like members are arranged like stripes that are parallel to each other. As shown in FIG. 21, the cross section of the projection 24 in the direction vertical to the sheet face is a trapezoidal one in which the upper width is narrower than the lower width.

Figure 18:
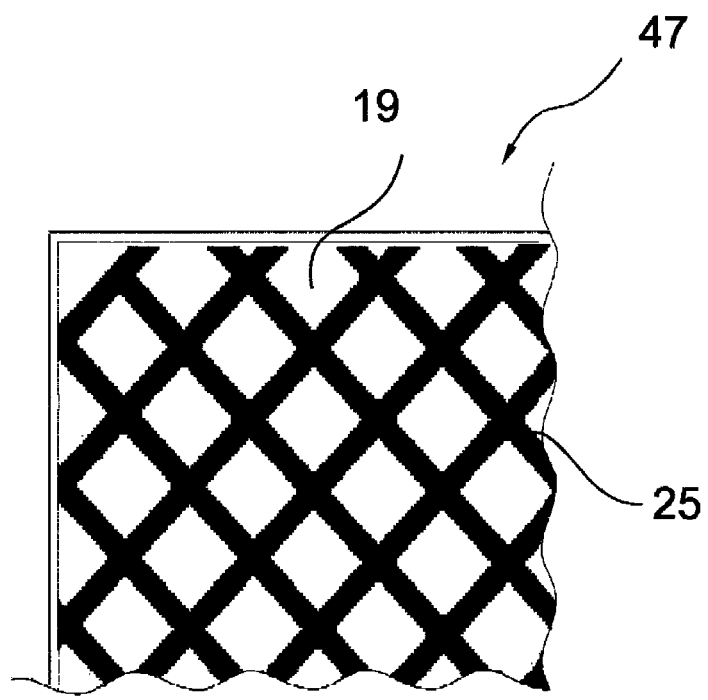
FIG. 18 is a plan view showing still another example of a sheet channel member in which projections are fixed onto a sheet.

FIG. 18 shows an example of continuous projections 25. As shown in FIG. 18, the projections 25 form a net-like member that continues in the sheet face direction. In this case, the height of the part at which the projections intersect with each other corresponds to the thickness of the projections, and is larger than the thickness of the non-intersecting part.

Figure 20:
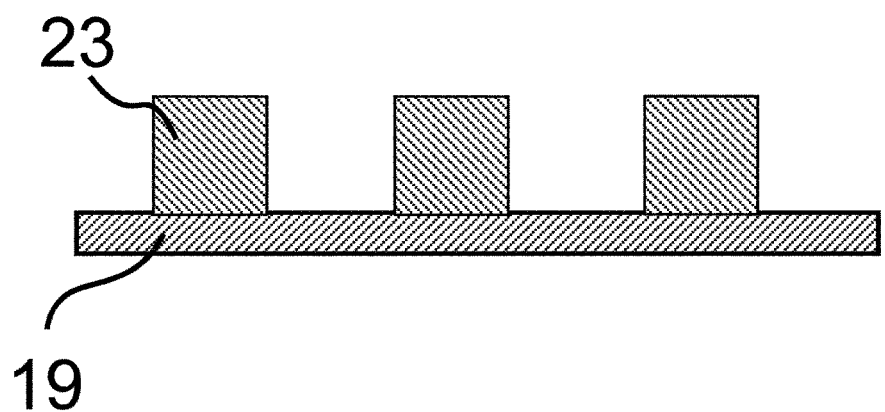
FIG. 20 is a cross-sectional view of the sheet channel member in which projections are fixed onto a sheet, viewing from the arrow direction of the E-E line in FIG. 16.

In any of the channel member shown in FIG. 14 to FIG. 18, the shape of the cross section may be changed to the shape of the cross section shown in FIG. 19 to FIG. 21. In other words, the shape of the plane and the shape of the cross section of channel members and also the arrangement thereof that are described as different configurations may be combined with each other. In that manner, for the channel members, any of the plane shapes of FIG. 14 to FIG. 18 may be combined in any desired manner with any of the cross-sectional shapes of FIG. 19 to FIG. 21, and the resultant variations are within the scope of the embodiments of the present invention.

From the viewpoint of preventing sinking of the membrane between plural projections during operation under pressure using the separation membrane element, the spacing between the neighboring projections is preferably 0.05 to 5.00 mm, more preferably 0.10 to 2.00 mm, and it is desirable that the separation membrane element is designed within the range. The spacing between the projections means the horizontal distance between the highest part of the projections differing in height and the highest part of other projections adjacent to the foregoing projections.

The thickness of the projections fixed to the sheet is preferably from 50 to 500 μm, more preferably from 75 to 450 μm, even more preferably from 100 to 400 μm. When the thickness of the projections is 500 μm or less, the number of the membrane leaves capable of being loaded in one vessel can be increased. When the thickness of the projections is 50 μm or more, the flowing resistance of fluid can be relatively reduced and therefore good separation performance and permeation performance can be attained.

The height difference between the projections fixed to the sheet may be measured from a cross-cut sample using Keyence's Digital Microscope "VHX-1000" (trade name). Some points differing in height are measured, and the values of the thickness are summed up, and the resultant value is divided by the total number of the measurement points.

The projections fixed to the sheet are so arranged as to continue from the inner edge of the sheet to the outer edge thereof in the winding direction. The inner side in the winding direction is the side nearer to the water collection tube in the sheet, and the outer side in the winding direction is the side distant to the water collection tube in sheet. Preferably, the projections are arranged to be vertical to the lengthwise direction of the water collection tube.

Regarding the configuration of the projections fixed to the sheet, the projections may be formed to the edge of the sheet, or the sheet may have some area with no projection formed around the edge thereof. In other words, so far as the projections fixed to the sheet are so arranged as to form flow channels on the permeate-side, the sheet may have any space with no projection formed therein. In the configuration having an area with no projection formed around the edge, when the permeate-side face of the separation membrane main body is fixed to another one with an adhesive, the adhesiveness between the separation membrane main bodies is improved since the adhesion faces do not have projections and are flat. Further, in the case where no projection is formed on the adhesion face, the amount of the channel member to be used in such a part may be reduced.

3. Method for Producing Separation Membrane (3-1) Separation Membrane Main Body

Methods for producing the separation membrane main body, though mentioned hereinbefore, are summarized below in brief.

A resin solution prepared by dissolving a resin in a good solvent is cast onto a substrate and immersed in pure water to form a porous supporting layer, whereby the porous supporting layer and the substrate are combined. Thereafter, as mentioned above, a separation functional layer is formed on the porous supporting layer. In order to enhance separation performance and permeation performance, chemical treatment using chlorine, acid, alkali, nitrous acid or so on is further carried out as required, and besides, monomers are washed out. Thus a continuous sheet of separation membrane main body is produced. Additionally, before or after the chemical treatment, an uneven pattern may be formed on the separation membrane main body by embossing or the like.

(3-2) Permeate-Side Channel Member (3-2-1) Channel Member Fixed to Permeate-Side Face of Separation Membrane Main Body The step of forming the permeate-side channel member may be carried out at any stage of separation membrane production. For example, the channel member may be provided before formation of the porous supporting layer on the substrate, or may be provided after formation of the porous supporting layer and before formation of the separation functional layer, or may be formed before or after the above-mentioned chemical treatment after formation of the separation functional layer.

For the step of forming layers contained in the channel member, coating, printing, spraying or the like may be employed. Examples of the usable devices include a nozzle-type hot melt applicator, a spray-type hot melt applicator, a flat nozzle-type hot melt applicator, a roll coater, an extrusion coater, a gravure printer, and a sprayer.

In the case where the permeate-side channel member is formed by processing a resin composition under heat, the processing temperature is not specifically limited as long as resin can be molded in melt. From the viewpoint of preventing the performance of the separation membrane from worsening by heat in processing, the processing temperature is preferably 230° C. or lower, more preferably 200° C. or lower.

In melt molding under heat, the melt viscosity of the composition constituting the permeate-side channel member is preferably 1 to 100 Pa·s. When the melt viscosity of the composition is 1 Pa·s or more, the melt moldability into the permeate-side channel member is enhanced and a desired shape can be given to the member and, in addition, the mechanical properties of the channel member are excellent and the handleability of the separation membrane can be improved. On the other hand, when the melt viscosity is 100 Pa·s or less, the immersion of the composition into the permeate-side face of the separation membrane main body is promoted and the fixation of the channel member can be enhanced, and the channel member does not peel from the separation membrane main body. As a result, a separation membrane having excellent handleability and quality can be obtained. The melt viscosity of the composition is more preferably 3 to 95 Pa·s, even more preferably 5 to 90 Pa·s.

In the step of cooling and solidifying the resin melt in melt molding, the resin may be forcedly cooled with cold air or liquid.

(3-2-2) Channel Member in which Projections are Formed on Sheet

In the case where a resin is formed into projections according to a method of forming projections on a sheet or by heating, the requirements described in the above-mentioned section "(3-2-1) Channel Member Fixed to Permeate-Side Face of Separation Membrane Main Body" are favorably employed.

4. Method for Producing Separation Membrane Element (4-1) Outline

In producing the separation membrane element, any of conventional element producing devises can be used. As a method for producing the element, any of the methods described in references (e.g. JP-B-44-14216, JP-B-4-11928 and JP-A-11-226366) can be adopted. Details on them are as follows.

(4-2) Formation of Feed-Side Flow Channel

When the feed-side channel member is a continuously-formed member such as a net, the feed-side flow channel can be formed by superposing such a feed-side channel member upon a separation membrane.

Additionally, feed-side channel members can be formed into a discontinuous or continuous shape by applying coatings of resin directly to a separation membrane. Also in the case of forming flow channel with feed-side channel members fixed to a separation membrane main body, configuring the feed-side channel members may be regarded as part of a method for producing a separation membrane.

Alternatively, the flow channel may be formed by processing a separation membrane main body into an uneven configuration. Examples of a processing method for forming an uneven configuration include methods of emboss forming, hydraulic forming and calendering. The embossing condition, the configuration formed by embossing and so on can be designed in accordance with required performance of the separation membrane element and so on. The processing for forming unevenness may be regarded as part of a method for producing a separation membrane.

(4-3) Stacking and Winding of Separation Membranes (4-3-1) Channel Member Fixed to Permeate-Side Face of Separation Membrane Main Body An envelope-shaped membrane 5 as shown in FIG. 1 is formed by: folding one sheet of a separation membrane into two leaves with the permeate-side facing inward and bonding the two leaves; or stacking two sheets of separation membranes with their permeate-side facing inward and bonding them. As mentioned hereinbefore, three sides of the envelope-shaped membrane are sealed. The sealing can be performed e.g. by adhesion with an adhesive or hot-melt, or by fusion using heat or laser light.

The adhesive used in forming an envelope-shaped membrane preferably has a viscosity within a range of 4 to 15 Pa·s, more preferably 5 to 12 Pa·s. There may be cases where wrinkles occur in a separation membrane to lower performance of the separation membrane element. However, in a case where an adhesive has a viscosity of 15 Pa·s or lower, wrinkles can be prevented from occurring when the separation membrane is wound around a water collection tube. In addition, in a case where the adhesive has a viscosity of 4 Pa·s or higher, leakage of the adhesive from between the separation membranes can be prevented, and the risk of adhesion of the adhesive to undesired portions can be reduced.

The amount of an adhesive applied is preferable such an amount that a width of the adhesive-applied portion is 10 to 100 mm after the separation membrane is wound around a water collection tube. Thereby, the separation membranes are adhered together with certainty, and flow of a raw fluid into the permeate-side is prevented. In addition, a relatively large effective membrane area can be secured.

As the adhesive, a urethane-based adhesive is preferable, and in order to adjust the viscosity of the adhesive to fall within the range of 4 to 15 Pa·s, it is appropriate that isocyanate as a main ingredient and polyol as a curing agent is mixed in an isocyanate:polyol ratio of 1:1 to 1:5. As for the viscosity of the adhesive, the viscosity of each of the main ingredient alone, the curing agent alone, and the mixture thereof in a specified blending ratio is previously measured by a B-type viscometer (JIS K 6833).

The separation membrane coated with an adhesive in the foregoing manner is placed so that the closed portion of the envelope-shaped membrane is situated on the inner side in the winding direction, and wound around the water collection tube. Thus the separation membrane is wound in a spiral fashion.

(4-3-2) Channel Member in which Projections are Formed on Sheet

An envelope-shaped membrane 5 is formed by: folding one sheet of a separation membrane into two leaves with the permeate-side facing inward and bonding the two leaves; or stacking two sheets of separation membranes with their permeate-side facing inward and bonding them. A sheet to which projections are fixed (sheet channel member) constituting the permeate-side channel member is inserted between them.

As mentioned hereinbefore, three sides of the envelope-shaped membrane are sealed. The sealing can be performed e.g. by adhesion with an adhesive or hot-melt, or by fusion using heat or laser light. Regarding the viscosity, the coating amount and the type of the adhesive, requirements described in the above-mentioned section "(4-3-1) Channel Member Fixed to Permeate-Side Face of Separation Membrane Main Body" are preferable.

The separation membrane coated with an adhesive in the foregoing manner is placed so that the closed portion of the envelope-shaped membrane is situated on the inner side in the winding direction, and wound around the water collection tube.

(4-4) Other Steps

The method for producing the separation membrane element may include a step of further winding film, filaments and the like onto the outside of the separation membrane-wound body formed in the foregoing manner, and additional other steps, such as a step of cutting the edges of separation membrane(s) in the length direction of the water collection tube and evening up them and a step of attaching side plates.

5. Use of Separation Membrane Element

Separation membrane elements may be used as a separation membrane module by being connected in series or in parallel and housed in a pressure vessel.

In addition, the separation membrane element and the separation membrane module can be configured as a fluid separation apparatus by being combined with a pump for feeding a fluid into them and a fluid pre-treating unit. By using such an apparatus, the feed water is separated e.g. into permeated water such as drinkable water and concentrated water which has not passed through the membrane, whereby water meeting the intended purpose can be obtained.

The higher the pressure during operation of the fluid separation apparatus, the more improvement in removal efficiency is achieved, but the more energy is required for the operation. With consideration given to this point and further to maintenance capabilities of feed flow channel and permeate flow channel of the separation membrane element, it is appropriate that the operation pressure at the time of permeation of raw fluid through the membrane module is from 0.2 to 8 MPa. Although the salt removal ratio decreases with increases in raw fluid temperature, as the raw fluid temperature decreases, so does the membrane permeation flux. It is therefore appropriate that the raw fluid temperature is from 5° C. to 45° C. Regarding the pH of raw fluid, when the pH thereof is high, scale of magnesium or the like may form in the case of feed water having a high salt concentration such as seawater or the like, and there may be a risk of membrane degradation owing to high pH operation, and therefore operation in a neutral range is preferred.

A fluid to be treated by the separation membrane element is not particularly limited, but when the separation membrane element is used in water treatment, a liquid mixture containing 500 mg/L to 100 g/L of TDS (Total Dissolved Solids), such as seawater, brackish water or waste water may be mentioned as feed water. In general, TDS represents a total dissolved solids amount, and is expressed in weight/volume, or weight ratio. According to the definition thereof, TDS can be calculated from the weight of matter remaining after evaporation of a solution filtered through a 0.45-μm filter at a temperature of 39.5° C. to 40.5° C., but more conveniently it can be converted from practical salinity (S).

EXAMPLES

The present invention is illustrated below in more detail by reference to the following Examples. However, the present invention should not be construed as being limited to these Examples.

A. Evaluation of Curling of Separation Membrane and Sheet Channel Member

A separation membrane in which a permeate-side channel member was fixed to the substrate side of a separation membrane main body, or a sheet to which projections were fixed (sheet channel member), were cut into test pieces having a length of 50 cm and a width of 50 cm. The test piece was put on a surface plate, and the lifting amount at four edges of the test piece was measured. The found data were averaged to obtain the curl height of the test piece. Five test pieces were subjected to the measurement, and the average value of the data of the five test pieces was referred to as the curl height (h) of the separation membrane or the sheet channel member. According to the following criteria, the curling resistance was evaluated. "A" and "B" were regarded as good results, and the separation membrane and the sheet channel member on such ranks were evaluated as excellent in handleability.
<Evaluation Criteria>
A: curl height (h)≤2 cm
B: 2 cm<curl height (h)≤5 cm
C: 5 cm<curl height (h)≤10 cm
D: 10 cm<curl height (h)

B. Melt Flow Rate (MFR)

According to JIS K7210:1999, MFR [g/10 min] was measured at a temperature of 230° C. and under a load of 21.18 N. The measurement was repeated three times, and the average value was referred to as MFR.

C. Measurement of Melting Endothermic Energy Amount of Permeate-Side Channel Member The melting endothermic energy amount of the permeate-side channel member was measured using a differential scanning calorimeter, Perkin Elmer's Model DSC-7. Specifically, 10 mg of a sample prepared by peeling the permeate-side channel member from the separation membrane main body or the sheet was heated up to 200° C. at a heating rate of 10° C./min, and from the endothermic peak area of the resultant DSC curve, the melting endothermic energy amount was calculated. The measurement was repeated three times, and the average value was referred to as the melting endothermic energy amount [J/g].

D. Melting Point of High-Crystalline Polypropylene

The melting point of the high-crystalline polypropylene (A) was measured with a differential scanning calorimeter, Perkin Elmer's Model DSC-7. Specifically, 10 mg of a polypropylene sample was heated up to 220° C. at a heating rate of 10° C./min, kept at 220° C. for 5 minutes, and then cooled to room temperature at a rate of 15 C.°/min. Subsequently, this was again heated up to 220° C. at a heating rate of 10° C./min, on this occasion, the endothermic peak top temperature appearing in a range of from 100 to 200° C. was referred to as the melting point. The measurement was repeated three times, and the average value was referred to as the melting point [° C.] of the high-crystalline polypropylene (A).

E. Melt Viscosity

Using a capillary rheometer, "Capillograph 1B" (trade name) manufactured by Toyo Seiki and using a die having L=40 mm and D=1 mm, the sample was measured at a temperature of 200° C. and at a shear rate of 24 sec$^{-1}$, and the value obtained was referred to as the melt viscosity [Pa·s]. The pellets to be used in measuring the melt viscosity were dried in vacuum at a temperature of 100° C. for 8 hours before the measurement, and the melting time during the measurement was 5 minutes.

F. Thickness and Spacing of Permeate-Side Channel Members

Photographs of cross sections of arbitrarily chosen 10 permeate-side channel members were taken by a scanning electron microscope (S-800, trade name, manufactured by Hitachi) set at a magnification of 500 times, and the thickness of the permeate-side channel members and the spacing between the neighboring permeate-side channel members were measured.

G. Elongation and Tensile Elasticity of Permeate-Side Channel Member

A sample prepared by peeling the permeate-side channel member from the separation membrane main body, or a sample prepared by peeling the projections from the sheet was subjected to a tensile test in an environment at a temperature of 20° C. and a humidity of 65%, using an autograph, "AG-50NISMS" (trade name) manufactured by Shimadzu, in which the sample length was 10 cm and the tension rate was 10 cm/min. The elongation at a point of the maximum load was referred to as the elongation [%] of the channel member, and from the stress-strain curve obtained in the measurement, the tensile elasticity [GPa] was determined. The measurement was repeated five times, and the average values were referred to as the elongation and the tensile elasticity.

H. Unwindability Evaluation of Separation Membrane Sheet and Sheet Channel Member In the process of fixing the permeate-side channel member to the substrate side of the separation membrane main body, or in the process of fixing projections onto the sheet, a sample having a length of 10 m was worked for winding up around a winder to obtain a separation membrane roll or a sheet roll. Subsequently, the separation membrane roll or the sheet roll was unwounded at a rate of 2 m/min to give 10 m of the separation membrane sheet or the sheet to which the projections were fixed (sheet channel member). Under the following criteria, the unwindability of the separation membrane sheet or the sheet channel material was evaluated. "A" and "B" were regarded as good results, and the separation membrane and the sheet channel member on such ranks were evaluated as excellent in unwindability.

<Evaluation Criteria>

A: The number of the parts where the permeate-side channel member stuck to the separation membrane functional layer, or the number of the parts where the projections stuck to the sheet (in the area with no fixed projection) was 0 to 2 parts/10 m.

B: The number of the parts where the permeate-side channel member stuck to the separation membrane functional layer, or the number of the parts where the projections stuck to the sheet (in the area with no fixed projection) was 3 to 5 parts/10 m.

C: The number of the parts where the permeate-side channel member stuck to the separation membrane functional layer, or the number of the parts where the projections stuck to the sheet (in the area with no fixed projection) was 6 to 10 parts/10 m.

D: The number of the parts where the permeate-side channel member stuck to the separation membrane functional layer, or the number of the parts where the projections stuck to the sheet (in the area with no fixed projection) was 11 parts/10 m or more.

I. Quality Evaluation of Separation Membrane Sheet and Sheet Channel Member

In the process of fixing the permeate-side channel member to the substrate side of the separation membrane main body, or in the process of fixing projections onto the sheet, a sample having a length of 10 m was worked for winding up around a winder to obtain a separation membrane roll or a sheet roll. Subsequently, the separation membrane roll or the sheet roll was unwounded at a rate of 2 m/min to give 10 m of the separation membrane sheet or the sheet to which the projections were fixed (sheet channel member), and the number of the parts where the channel member was broken was counted. Under the following criteria, the handleability of the separation membrane sheet or the sheet channel material was evaluated. "A" and "B" were regarded as good results, and the separation membrane and the sheet channel member on such ranks are evaluated as excellent in quality.

<Evaluation Criteria>

A: The number of the parts where the permeate-side channel member was broken was 0 to 2 parts/10 m.

B: The number of the parts where the permeate-side channel member was broken was 3 to 5 parts/10 m.

C: The number of the parts where the permeate-side channel member was broken was 6 to 10 parts/10 m.

D: The number of the parts where the permeate-side channel member was broken was 11 parts/10 m or more.

J. Amount of Fresh Water Produced, and Desalination Ratio (TDS Removal Ratio)

In the spiral-type separation membrane element, saline water having a concentration of 500 mg/L, a pH value of 6.5 and a temperature of 25° C. was fed as feed water. Operation was continued for 1 hour under the condition that the operation pressure was 1.5 MPa and 2.5 MPa, and thereafter the operation was continued under the same condition for 10 minutes to obtain permeated water. From the amount of the resultant permeated water, the amount (cubic meter) of water permeated per a day per the separation membrane element was represented as the amount of fresh water produced [m$^3$/day].

In addition, the electroconductivity of the feed water and the permeated water was measured to determine the practical salinity (S), using an electroconductivity meter manufactured by DKK-TOA Corporation. The resultant practical salinity was regarded as the salt concentration, and using the following formula, the TDS removal ratio was determined. Three elements were analyzed for this evaluation, and the average value was referred to as the amount of fresh water produced and the TDS removal ratio.

TDS removal ratio (%)=100×{1−(TDS concentration in permeated water/TDS concentration in feed water)}

(Production of Separation Membrane Sheet)

A dimethylformamide (DMF) solution containing 15.0 wt % of polysulfone was cast onto a nonwoven fabric of polyethylene terephthalate long fibers (fineness: 1.1 dtex, thickness: 90 μm, air permeability: 1 cc/cm$^2$/sec, fiber orientation: 40° in the surface layer on the porous supporting layer side, 20° in the surface on the side opposite to the porous supporting layer) in a thickness of 180 μm at room temperature (25° C.), and immediately immersed in pure water, and left as such for 5 minutes to obtain a roll of fiber-reinforced polysulfone porous supporting membrane having a thickness of 130 μm.

Subsequently, on the polysulfone-cast surface of the porous supporting membrane, an aqueous solution of meta-phenylenediamine (1.8 wt %)/ε-caprolactam (4.5 wt %) was applied and then nitrogen was sprayed thereover through an air nozzle to remove the excessive aqueous solution from the surface of the supporting membrane, and thereafter an n-decane solution (25° C.) containing 0.06 wt % of trimeric acid chloride was applied thereto so as to completely wet the membrane surface. Subsequently, the excessive solution was removed from the membrane by air blowing, the membrane was washed with hot water (80° C.), and then dried by air blowing to obtain a separation membrane main body.

(Formation of Resin Constituting Permeate-Side Channel Member)

A high-crystalline polypropylene (PP) (A), a low-crystalline α-olefin polymer (B) and additives (C, D) were previously blended in the weight ratio shown in Table 1 to Table 5, and then melt-kneaded using a twin-screw extruder (Technovel's KZW-15) at 200° C. The resin discharged through the extruder die was fully cooled in a water tank, and then cut into 5-mm composition pellets.

Example 1

Composition pellets containing 55 wt % of high-crystalline PP (MFR 1000 g/10 min, melting point 161° C.) and 45 wt % of low-crystalline α-olefin polymer (Idemitsu Kosan's low-stereoregularity polypropylene "L-MODU•S400" (trade name)) were melted at 200° C., and, via a gear pump, the resin melt was fed into an applicator equipped with a comb-shaped shim (slit width: 0.4 mm, pitch: 0.8 mm).

Next, the resin melt was discharged out from the comb-shaped shim, and a permeate-side channel member was stripe-like formed on the permeate-side of a separation membrane main body at a rate of 10 m/min. Via a free roll, this was wound around a winder to obtain a separation membrane roll (winding tension: 15 N/m, winding core diameter: 3 inches). 10 m of the sheet was unwounded from the separation membrane roll to obtain a separation membrane sheet.

The permeate-side channel member was cut off from the resultant separation membrane sheet, and the properties of the channel member were evaluated. As a result, the melting endothermic energy amount (ΔH) was 46 J/g, the tensile elongation was 25%, and the tensile elasticity was 0.31 GPa.

Next, from the separation membrane sheet, sample pieces having a length of 50 cm and a width of 50 cm were prepared, and the curl height thereof was evaluated. As a result, the curl height was 1.9 cm and was low, and the handleability of the separation membrane was extremely excellent. This would be because the content of the high-crystalline PP in the channel member and ΔH thereof were controlled in the preferred range.

The unwindability of the separation membrane sheet was evaluated. The separation membrane sheet did not stick to the separation membrane functional layer surface, and was smoothly unwound. In addition, the channel members were checked for breakage or damage, and as a result, no broken parts were seen. That is, the unwindability and the quality of the separation membrane sheet were extremely good.

In addition, the separation membrane sheet was cut and folded in the form of an envelope with one side kept open. Into the space between the thus-folded separation membrane sheet, a net serving as a feed-side channel member (thickness: 800 μm, pitch: 5 mm×5 mm) was continuously stacked, and an urethane adhesive (isocyanate/polyol=1/3) was applied to the edges on both sides of the separation membrane sheet in the lengthwise direction of a perforated water collection tube, and these were overlaid to realize an effective area of 37 m² as a separation membrane element, thereby providing 26 envelope-like membranes having a width of 930 mm.

Subsequently, a predetermined part on the opening-side of the envelope-like membrane was adhered to the outer periphery of a perforated water collection tube, and was spirally wound therearound to prepare a wound body. A film was overwound around the outer periphery of the wound body, fixed with a tape, and then edge-cut, and a side plate was fitted and a filament was wound therearound to obtain an element having a diameter of 8 inches.

The separation membrane element was put into a fiber-reinforced plastic cylindrical pressure vessel, and the desalination ratio and the water production amount were measured under an operation pressure of 1.5 MPa. Regarding the element performance, the desalination ratio was 98.8%, and the water production amount was 34.5 m³/day. Under an operation pressure of 2.5 MPa, the desalination ratio was 99.0%, and the water production amount was 58.5 m³/day. Thus, the separation membrane element exhibited extremely good performance even under high-pressure operation condition.

The results are shown in Table 1.

Example 2

An evaluation was carried out in the same manner as in Example 1, except that the resin constituting the permeate-side channel member was changed to 92 wt % of high-crystalline PP (same as in Example 1)/8 wt % of low-crystalline α-olefin polymer (Idemitsu Kosan's low-stereoregularity PP "L-MODU•S400" (trade name)). The results are shown in Table 1.

Since ΔH was high, the curl height was 4.7 cm and was somewhat high. However, the handleability of the separation membrane was good. An unwindability evaluation of the separation membrane sheet was carried out, and the separation membrane sheet did not stick to the separation membrane functional layer surface, and smooth unwinding was possible. On the other hand, the channel members were checked for brakeage or damage, and as a result, the number of the broken parts was 5 parts per 10 m, owing to the small tensile elongation of the channel member. However, the quality of the separation membrane sheet was excellent.

Example 3

An evaluation was carried out in the same manner as in Example 1, except that the resin constituting the permeate-side channel member was changed to 65 wt % of high-crystalline PP (same as in Example 1)/20 wt % of low-crystalline α-olefin polymer (Idemitsu Kosan's low-stereoregularity PP "L-MODU•S400" (trade name))/15 wt % of thermal flowability improver (Yasuhara Chemical's terpene resin hydride "Clearon P125" (trade name)). The results are shown in Table 1.

The curl height was 1.5 cm and was low, and the handleability of the separation membrane was extremely excellent. An unwindability evaluation of the separation membrane sheet was carried out, and the separation membrane sheet did not stick to the separation membrane functional layer surface, and smooth unwinding was possible. In addition, no broken parts were seen in the separation membrane sheet, and the unwindability and the quality of the separation membrane sheet were extremely good.

Example 4

An evaluation was carried out in the same manner as in Example 1, except that the resin constituting the permeate-side channel member was changed to 40 wt % of high-crystalline PP (same as in Example 1)/30 wt % of low-crystalline α-olefin polymer (Idemitsu Kosan's low-stereoregularity PP "L-MODU•S600" (trade name))/30 wt % of thermal flowability improver (Yasuhara Chemical's terpene resin hydride "Clearon P115" (trade name)). The results are shown in Table 1.

The curl height was 0.5 cm and was low, and the handleability of the separation membrane was extremely excellent. An unwindability evaluation of the separation membrane sheet was carried out, and the separation membrane sheet stuck in some parts (5 parts) to the separation membrane functional layer surface, but relatively smooth unwinding was possible, and the unwindability was good. In addition, no broken parts were seen in the separation membrane sheet, and the quality of the separation membrane sheet was extremely good.

Example 5

An evaluation was carried out in the same manner as in Example 1, except that the resin constituting the permeate-side channel member was changed to 75 wt % of high-crystalline PP (same as in Example 1)/5 wt % of low-crystalline α-olefin polymer (Idemitsu Kosan's low-stereoregularity PP "L-MODU•S600" (trade name))/20 wt % of thermal flowability improver (Arakawa Chemical Industry's hydrogenated petroleum resin "alicyclic saturated hydrocarbon resin Alcon P-100" (trade name)). The results are shown in Table 1.

The curl height was 2.5 cm and was low, and the handleability of the separation membrane was extremely excellent. An unwindability evaluation of the separation membrane sheet was carried out, and the separation membrane sheet did not stick to the separation membrane functional layer surface, and smooth unwinding was possible. Though the separation membrane sheet had 2 broken parts, the unwindability and the quality of the separation membrane sheet were extremely good.

Example 6

An evaluation was carried out in the same manner as in Example 1, except that the resin constituting the permeate-side channel member was changed to 85 wt % of high-crystalline PP (same as in Example 1)/10 wt % of low-crystalline α-olefin polymer (Idemitsu Kosan's low-stereoregularity PP "L-MODU•S600" (trade name))/5 wt % of thermal flowability improver (Idemitsu Kosan's hydrogenated petroleum resin "dicyclopentadiene/aromatic copolymer hydrogenated petroleum resin I-MARV P125" (trade name)). The results are shown in Table 1.

Since ΔH was high, the curl height was 4.2 cm and was somewhat high. However, the handleability of the separation membrane was excellent. An unwindability evaluation of the separation membrane sheet was carried out, and the separation membrane sheet did not stick to the separation membrane functional layer surface, and smooth unwinding was possible. On the other hand, the channel members were checked for brakeage or damage, and as a result, the number of the broken parts was 3 parts per 10 m, owing to the small tensile elongation of the channel member. However, the quality of the separation membrane sheet was excellent.

Example 7

An evaluation was carried out in the same manner as in Example 1, except that the resin constituting the permeate-side channel member was changed to 70 wt % of high-crystalline PP (same as in Example 1)/30 wt % of low-crystalline α-olefin polymer (Mitsui Chemical's propylene/olefin copolymer "Tafmer PN-20300" (trade name)). The results are shown in Table 2.

The curl height was 2.0 cm and was low, and the handleability of the separation membrane was extremely excellent. An unwindability evaluation of the separation membrane sheet was carried out, and the separation membrane sheet did not stick to the separation membrane functional layer surface, and smooth unwinding was possible. The separation membrane sheet had one broken part, but the unwindability and the quality of the separation membrane sheet were extremely good.

Example 8

An evaluation was carried out in the same manner as in Example 1, except that the resin constituting the permeate-side channel member was changed to 50 wt % of high-crystalline PP (same as in Example 1)/20 wt % of low-crystalline α-olefin polymer (Mitsui Chemical's propylene/olefin copolymer "Tafmer PN-20300" (trade name))/20 wt % of thermal flowability improver (Arakawa Chemical Industry's hydrogenated petroleum resin "alicyclic saturated hydrocarbon resin Alcon P-100" (trade name))/10 wt % of talc (Hayashi Chemical's "Micron White 5000S" (trade name)). The results are shown in Table 2.

The curl height was 1.0 cm and was low, and the handleability of the separation membrane was extremely excellent. An unwindability evaluation of the separation membrane sheet was carried out, and the separation membrane sheet did not stick to the separation membrane functional layer surface, and smooth unwinding was possible. The separation membrane sheet had one broken part, but the unwindability and the quality of the separation membrane sheet were extremely good.

Example 9

An evaluation was carried out in the same manner as in Example 1, except that the resin constituting the permeate-side channel member was changed to 60 wt % of high-crystalline PP (same as in Example 1)/10 wt % of low-crystalline α-olefin polymer (Sumitomo Chemical's special propylene elastomer "Tafcelene H-5002" (trade name))/30 wt % of thermal flowability improver (Yasuhara Chemical's terpene resin hydride "Clearon P125" (trade name)). The results are shown in Table 2.

The curl height was 0.7 cm and was low, and the handleability of the separation membrane was extremely excellent. An unwindability evaluation of the separation membrane sheet was carried out. The separation membrane sheet stuck to the separation membrane functional layer surface at four parts, but relatively smooth unwinding was possible, and the unwindability of the sheet was good. The separation membrane sheet had two broken parts, but the quality of the separation membrane sheet was extremely good.

Example 10

An evaluation was carried out in the same manner as in Example 1, except that the resin constituting the permeate-side channel member was changed to 60 wt % of high-crystalline PP (manufactured by Prime Polymer Co., Ltd., MFR 120 g/10 min, melting point 165° C.)/20 wt % of low-crystalline α-olefin polymer (Idemitsu Kosan's low-stereoregularity PP "L-MODU S400" (trade name)/20 wt % of thermal flowability improver (manufactured by S. Kato & Co., Fischer-Tropsch wax "Sasol Wax H1" (trade name)), and the processing temperature was changed to 225° C. The results are shown in Table 2.

The curl height was 1.0 cm and was low, and the handleability of the separation membrane was extremely excellent. An unwindability evaluation of the separation membrane sheet was carried out. The separation membrane sheet stuck to the separation membrane functional layer surface at two parts, but relatively smooth unwinding was possible, and the unwindability of the sheet was extremely good. The separation membrane sheet had four broken parts, but the quality of the separation membrane sheet was good.

Example 11

An evaluation was carried out in the same manner as in Example 1, except that the resin constituting the permeate-side channel member was changed to 45 wt % of high-crystalline PP (Japan Polypropylene's "BC10HRF" (trade name), MFR 100 g/10 min, melting point 167° C.)/15 wt % of low-crystalline α-olefin polymer (Mitsui Chemical's propylene/olefin copolymer, "Tafmer PN-20300" (trade name))/20 wt % of thermal flowability improver (Arakawa Chemical Industry's hydrogenated petroleum resin "alicyclic saturated hydrocarbon resin Alcon P-125" (trade name))/20 wt % of thermal flowability improver (Sanyo Chemical's PP wax "Viscol 550P" (trade name)), and the processing temperature was changed to 230° C. The results are shown in Table 2.

The curl height was 1.4 cm and was low, and the handleability of the separation membrane was extremely excellent. An unwindability evaluation of the separation membrane sheet was carried out. The separation membrane sheet stuck to the separation membrane functional layer surface at five parts, but relatively smooth unwinding was possible, and the unwindability of the sheet was good. The separation membrane sheet had two broken parts, but the quality of the separation membrane sheet was extremely good.

Comparative Example 1

An evaluation was carried out in the same manner as in Example 1, except that the resin constituting the permeate-side channel member was changed to high-crystalline PP (same as in Example 1) alone. The results are shown in Table 3.

Since ΔH was extremely high, the curl height was 10 cm or more and the handleability was extremely bad. An unwindability evaluation of the separation membrane sheet was carried out. The separation membrane sheet did not stick to the separation membrane functional layer surface, and the unwindability was extremely good. However, since the tensile elongation of the channel member was extremely low, the separation membrane sheet broke at 11 parts, and the quality of the separation membrane sheet was extremely bad.

Comparative Example 2

An evaluation was carried out in the same manner as in Example 1, except that the resin constituting the permeate-side channel member was changed to 97 wt % of high-crystalline PP (same as in Example 1)/3 wt % of low-crystalline α-olefin polymer (Idemitsu Kosan's low-stereoregularity PP "L-MODU•S400" (trade name)). The results are shown in Table 3.

Since ΔH was high, the curl height was 9.5 cm and was high, and the handleability was bad. An unwindability evaluation of the separation membrane sheet was carried out. The separation membrane sheet did not stick to the separation membrane functional layer surface, and smooth unwinding was possible. On the other hand, the channel member was checked for broken parts and, as a result, owing to the small elongation elasticity of the channel member, 10 broken parts were seen per 10 m of the sheet, and the quality of the separation membrane sheet was poor.

Comparative Example 3

An evaluation was carried out in the same manner as in Example 1, except that the resin constituting the permeate-side channel member was changed to 35 wt % of high-crystalline PP (same as in Example 1)/65 wt % of low-crystalline α-olefin polymer (Idemitsu Kosan's low-stereoregularity PP "L-MODU•S400" (trade name)). The results are shown in Table 3.

The curl height was 0.2 cm and was extremely low, and the handleability was extremely good. In addition, no broken parts were seen in the separation membrane sheet, and the quality of the separation membrane sheet was extremely good.

On the other hand, an unwindability evaluation of the separation membrane sheet was carried out. The separation membrane sheet stuck to the separation membrane functional layer surface in many parts (10 parts), and in unwinding, the separation membrane functional layer partly peeled, and smooth unwinding was extremely difficult.

In addition, like in Example 1, the desalination ratio and the water production amount were measured. The desalination ratio was 98.8% and the element performance was good, but the water production amount was 27.4 $m^3$/day, and was smaller by 20% or more than that in the above-mentioned Examples. After the operation, the permeate-side channel member was observed. The channel member compressively deformed and the flow channel for permeated water clogged. This would be because the pressure resistance (elasticity) of the resin constituting the channel member is low.

Comparative Example 4

An evaluation was carried out in the same manner as in Example 1, except that the resin constituting the permeate-side channel member was changed to 20 wt % of high-crystalline PP (same as in Example 1)/40 wt % of low-crystalline α-olefin polymer (Idemitsu Kosan's low-stereoregularity PP "L-MODU•S600" (trade name))/40 wt % of thermal flowability improver (Yasuhara Chemical's terpene resin hydride "Clearon P115" (trade name)). The results are shown in Table 3.

The curl height was 0.1 cm and was extremely low, and the handleability of the separation membrane was extremely good. An unwindability evaluation of the separation membrane sheet was carried out. The separation membrane sheet stuck to the separation membrane functional layer surface in many parts (11 parts or more), and in unwinding, the separation membrane functional layer partly peeled, and smooth unwinding was extremely difficult. On the other hand, no broken parts were seen in the separation membrane sheet, and the quality of the separation membrane sheet was extremely good. In addition, like in Example 1, the desalination ratio and the water production amount were measured. The desalination ratio was 97.8% and the element performance was good, but the water production amount was 25.0 $m^3$/day, and was smaller by 20% or more than that in the above-mentioned Example 1. After the operation, the permeate-side channel member was observed. The channel member underwent significant compressive deformation, and the flow channel for permeated water mostly clogged. This would be because the pressure resistance (elasticity) of the resin constituting the channel member is low.

TABLE 1

|  |  | Example 1 | Example 2 | Example 3 |
|---|---|---|---|---|
| Permeate-side | Where the resin fixed | separation membrane main | separation membrane main | separation membrane main |

TABLE 1-continued

| Channel Member | Constituent Resins and Compositional Ratio | high-crystalline polypropylene (A) | body PP | body PP | body PP |
|---|---|---|---|---|---|
| | | low-crystalline α-olefin polymer (B) | low-stereoregularity PP (L-MODU S400) | low-stereoregularity PP (L-MODU S400) | low-stereoregularity PP (L-MODU S400) |
| | | additive (C) | no | no | terpene resin hydride (Clearon P-125) |
| | | additive (D) | no | no | no |
| | | weight ratio (A)/(B)/(C)/(D) | 55/45/0/0 | 92/8/0/0 | 65/20/15/0 |
| | Melt Viscosity [Pa · s] of constituent resin | | 14.4 | 23.5 | 12.9 |
| | Melting Endothermic Energy Amount (ΔH) [J/g] | | 46 | 68 | 50 |
| | Mechanical Properties | Tensile Elongation [%] | 25 | 7 | 12 |
| | | Tensile Elasticity [GPa] | 0.31 | 1.08 | 0.72 |
| | Height of permeate-side channel member [μm] | | 302 | 277 | 297 |
| | Spacing of permeate-side channel member [μm] | | 395 | 399 | 400 |
| | Curling Evaluation of Separation Membrane | | A | B | A |
| | Unwindability evaluation of Separation Membrane | | A | A | A |
| | Quality Evaluation of Separation Membrane | | A | B | A |
| Element Performance (operation pressure 1.5 MPa) | water production amount [m³/day] | | 34.5 | 36.0 | 35.5 |
| | TDS removal ratio [%] | | 98.8 | 98.7 | 98.7 |
| Element Performance (operation pressure 2.5 MPa) | water production amount [m³/day] | | 54.9 | 58.5 | 57.0 |
| | TDS removal ratio [%] | | 99.0 | 98.9 | 99.0 |

| | | | Example 4 | Example 5 | Example 6 |
|---|---|---|---|---|---|
| Permeate-side Channel Member | Where the resin fixed | | separation membrane main body | separation membrane main body | separation membrane main body |
| | Constituent Resins and Compositional Ratio | high-crystalline polypropylene (A) | PP | PP | PP |
| | | low-crystalline α-olefin polymer (B) | low-stereoregularity PP (L-MODU S600) | low-stereoregularity PP (L-MODU S600) | low-stereoregularity PP (L-MODU S600) |
| | | additive (C) | terpene resin hydride (Clearon P-115) | hydrogenated petroleum resin (Alcon P-100) | hydrogenated petroleum resin (1-MARV P-125) |
| | | additive (D) | no | no | no |
| | | weight ratio (A)/(B)/(C)/(D) | 40/30/30/0 | 75/5/20/0 | 85/10/5/0 |
| | Melt Viscosity [Pa · s] of constituent resin | | 9.1 | 12.5 | 22.0 |
| | Melting Endothermic Energy Amount (ΔH) [J/g] | | 30 | 55 | 64 |
| | Mechanical Properties | Tensile Elongation [%] | 18 | 11 | 9 |
| | | Tensile Elasticity [GPa] | 0.60 | 1.12 | 1.05 |
| | Height of permeate-side channel member [μm] | | 255 | 264 | 250 |
| | Spacing of permeate-side channel member [μm] | | 420 | 408 | 385 |
| | Curling Evaluation of Separation Membrane | | A | B | B |
| | Unwindability evaluation of Separation Membrane | | B | A | A |
| | Quality Evaluation of Separation Membrane | | A | A | B |
| Element Performance (operation pressure 1.5 MPa) | water production amount [m³/day] | | 34.2 | 35.6 | 35.9 |
| | TDS removal ratio [%] | | 98.4 | 98.5 | 98.6 |
| Element Performance (operation pressure 2.5 MPa) | water production amount [m³/day] | | 54.6 | 58.2 | 58.1 |
| | TDS removal ratio [%] | | 98.7 | 98.8 | 98.9 |

TABLE 2

| | | | Example 7 | Example 8 | Example 9 |
|---|---|---|---|---|---|
| Permeate-side Channel Member | Where the resin fixed | | separation membrane main body | separation membrane main body | separation membrane main body |
| | Constituent Resins and Compositional Ratio | high-crystalline polypropylene (A) | PP | PP | PP |
| | | low-crystalline α-olefin polymer (B) | olefin elastomer (Tafmer PN-20300) | olefin elastomer (Tafmer PN-20300) | olefin elastomer (Tafcelene H5002) |
| | | additive (C) | no | hydrogenated petroleum resin (Alcon P-100) | terpene resin hydride (Clearon P-125) |
| | | additive (D) | no | talc | no |
| | | weight ratio (A)/(B)/(C)/(D) | 70/30/0/0 | 50/20/20/10 | 60/10/30/0 |
| | Melt Viscosity [Pa · s] of constituent resin | | 67.1 | 40.5 | 25.0 |
| | Melting Endothermic Energy Amount (ΔH) | | 51 | 40 | 45 |

TABLE 2-continued

|  |  |  |  |  |
|---|---|---|---|---|
|  | [J/g] |  |  |  |
| Mechanical | Tensile Elongation [%] | 15 | 12 | 9 |
| Properties | Tensile Elasticity [GPa] | 0.45 | 0.41 | 0.84 |
| Height of permeate-side channel member [μm] |  | 289 | 290 | 275 |
| Spacing of permeate-side channel member [μm] |  | 403 | 391 | 388 |
| Curling Evaluation of Separation Membrane |  | A | A | A |
| Unwindability evaluation of Separation Membrane |  | A | A | B |
| Quality Evaluation of Separation Membrane |  | A | A | A |
| Element Performance (operation pressure 1.5 MPa) | water production amount [m$^3$/day] | 35.1 | 34.9 | 35.7 |
|  | TDS removal ratio [%] | 98.7 | 98.8 | 98.6 |
| Element Performance (operation pressure 2.5 MPa) | water production amount [m$^3$/day] | 56.5 | 55.8 | 58.8 |
|  | TDS removal ratio [%] | 99.0 | 99.0 | 98.8 |

|  |  |  | Example 10 | Example 11 |
|---|---|---|---|---|
| Permeate-side Channel Member | Where the resin fixed |  | separation membrane main body | separation membrane main body |
|  | Constituent Resins and Compositional Ratio | high-crystalline polypropylene (A) | PP (low MFR) | block PP |
|  |  | low-crystalline α-olefin polymer (B) | low-stereoregularity PP (L-MODU S400) | olefin elastomer (Tafmer PN-20300) |
|  |  | additive (C) | synthetic wax (Sasol H1) | hydrogenated petroleum resin (Alcon P-125) |
|  |  | additive (D) | no | PP wax (Viscol 550P) |
|  |  | weight ratio (A)/(B)/(C)/(D) | 60/20/20/0 | 45/15/20/20 |
| Melt Viscosity [Pa · s] of constituent resin |  |  | 59.3 | 62.0 |
| Melting Endothermic Energy Amount (ΔH) [J/g] |  |  | 40 | 31 |
| Mechanical | Tensile Elongation [%] |  | 10 | 17 |
| Properties | Tensile Elasticity [GPa] |  | 0.55 | 0.50 |
| Height of permeate-side channel member [μm] |  |  | 289 | 295 |
| Spacing of permeate-side channel member [μm] |  |  | 396 | 400 |
| Curling Evaluation of Separation Membrane |  |  | A | A |
| Unwindability evaluation of Separation Membrane |  |  | A | B |
| Quality Evaluation of Separation Membrane |  |  | B | A |
| Element Performance (operation pressure 1.5 MPa) | water production amount [m$^3$/day] |  | 35.5 | 33.9 |
|  | TDS removal ratio [%] |  | 98.3 | 98.9 |
| Element Performance (operation pressure 2.5 MPa) | water production amount [m$^3$/day] |  | 57.8 | 54.5 |
|  | TDS removal ratio [%] |  | 98.6 | 99.0 |

TABLE 3

|  |  |  | Comparative Example 1 | Comparative Example 2 |
|---|---|---|---|---|
| Permeate-side Channel Member | Where the resin fixed |  | separation membrane main body | separation membrane main body |
|  | Constituent Resins and Compositional Ratio | high-crystalline polypropylene (A) | PP | PP |
|  |  | low-crystalline α-olefin polymer (B) | no | low-stereoregularity PP (L-MODU S400) |
|  |  | additive (C) | no | no |
|  |  | additive (D) | no | no |
|  |  | weight ratio (A)/(B)/(C)/(D) | 100/0/0/0 | 97/3/0/0 |
| Melt Viscosity [Pa · s] of constituent resin |  |  | 26.1 | 25.0 |
| Melting Endothermic Energy Amount (ΔH) [J/g] |  |  | 80 | 76 |
| Mechanical | Tensile Elongation [%] |  | 2 | 3 |
| Properties | Tensile Elasticity [GPa] |  | 1.30 | 1.27 |
| Height of permeate-side channel member [μm] |  |  | 305 | 303 |
| Spacing of permeate-side channel member [μm] |  |  | 402 | 401 |
| Curling Evaluation of Separation Membrane |  |  | D | C |
| Unwindability evaluation of Separation Membrane |  |  | A | A |
| Quality Evaluation of Separation Membrane |  |  | D | C |
| Element Performance (operation pressure 1.5 MPa) | water production amount [m$^3$/day] |  | 36.0 | 35.9 |
|  | TDS removal ratio [%] |  | 98.7 | 98.7 |
| Element Performance (operation pressure 2.5 MPa) | water production amount [m$^3$/day] |  | 59.8 | 59.5 |
|  | TDS removal ratio [%] |  | 99.0 | 98.8 |

TABLE 3-continued

|  |  | Comparative Example 3 | Comparative Example 4 |
|---|---|---|---|
| Permeate-side Channel Member | Where the resin fixed | separation membrane main body | separation membrane main body |
| Constituent Resins and Compositional Ratio | high-crystalline polypropylene (A) | PP | PP |
|  | low-crystalline α-olefin polymer (B) | low-stereoregularity PP (L-MODU S400) | low-stereoregularity PP (L-MODU S600) |
|  | additive (C) | no | terpene resin hydride (Clearon P-115) |
|  | additive (D) | no | no |
|  | weight ratio (A)/(B)/(C)/(D) | 35/65/0/0 | 20/40/40/0 |
| Melt Viscosity [Pa · s] of constituent resin | | 8.3 | 3.6 |
| Melting Endothermic Energy Amount (ΔH) [J/g] | | 19 | 15 |
| Mechanical Properties | Tensile Elongation [%] | 29 | 14 |
|  | Tensile Elasticity [GPa] | 0.14 | 0.04 |
| Height of permeate-side channel member [μm] | | 298 | 295 |
| Spacing of permeate-side channel member [μm] | | 399 | 396 |
| Curling Evaluation of Separation Membrane | | A | A |
| Unwindability evaluation of Separation Membrane | | C | D |
| Quality Evaluation of Separation Membrane | | A | A |
| Element Performance (operation pressure 1.5 MPa) | water production amount [m³/day] | 27.4 | 25.0 |
|  | TDS removal ratio [%] | 98.8 | 97.8 |
| Element Performance (operation pressure 2.5 MPa) | water production amount [m³/day] | 38.0 | 31.0 |
|  | TDS removal ratio [%] | 99.0 | 98.2 |

Example 12

Composition pellets containing 45 wt % of high-crystalline PP (MFR 1000 g/10 min, melting point 161° C., same as in Example 1) and 55 wt % of low-crystalline α-olefin polymer (Idemitsu Kosan's low-stereoregularity polypropylene "L-MODU•S400" (trade name)) were melted at 210° C., and, via a gear pump, the resin melt was fed into an applicator equipped with a comb-shaped shim (slit width: 0.35 mm, pitch: 0.7 mm).

Next, the resin melt was discharged out from the comb-shaped shim, and projections were stripe-like formed on a sheet (polyethylene terephthalate long-fiber nonwoven fabric, single yarn fineness: 1.2 dtex, thickness: 55 μm, unit weight: 28 g/m²) at a rate of 8.5 m/min, and via a free roll, this was wound up around a winder to obtain a sheet roll (winding tension: 15 N/m, core diameter used in winding: 3 inches). 10 m of the sheet was unwound from the sheet roll to obtain a sheet to which projections were fixed (sheet channel member).

The projections were cut off from the resultant sheet, and the characteristics of the channel member were evaluated. As a result, the melting endothermic energy amount (ΔH) was 33 J/g, the tensile elongation was 26%, and the tensile elasticity was 0.23 GPa.

Next, from the sheet channel member, sample pieces having a length of 50 cm and a width of 50 cm were prepared, and the curl height thereof was evaluated. As a result, the curl height was 0.8 cm and was low, and the handleability of the separation membrane was extremely excellent. This would be because the content of the high-crystalline PP in the channel member and ΔH thereof were controlled in the preferred range.

The unwindability of the sheet channel member was evaluated. The projections did not stick to the other sheet face which contacted therewith in the wound state, and smooth unwinding was possible. In addition, the channel members were checked for breakage or damage, and as a result, no broken parts were seen. That is, the unwindability and the quality of the sheet channel member were extremely good.

In addition, the sheet channel member was cut and folded in the form of an envelope with one side kept open. Into the space between the thus-folded separation membrane sheet, a net serving as a feed-side channel member (thickness: 800 μm, pitch 5 mm×5 mm) was continuously stacked, the sheet channel member serving as a permeate-side channel member was inserted into the space of the envelope-shaped sheets, an urethane adhesive (isocyanate/polyol=1/3) was applied, and these were overlaid to realize an effective area of 37 m² as a separation membrane element, thereby preparing 26 envelope-like membranes having a width of 930 mm.

Subsequently, a predetermined part on the opening-side of the envelope-like membrane was adhered to the outer periphery of a perforated water collection tube, and was spirally wound therearound to prepare a wound body. A film was overwound around the outer periphery of the wound body, fixed with a tape, and then edge-cut, and a side plate was fitted and a filament was wound therearound to obtain an element having a diameter of 8 inches.

The separation membrane element was put into a fiber-reinforced plastic cylindrical pressure vessel, and the desalination ratio and the water production amount were measured. Regarding the element performance, the desalination ratio was 98.9%, and the water production amount was 33.9 m³/day, and the separation membrane element exhibited extremely good performance even under high-pressure operation condition.

The results are shown in Table 4.

Example 13

An evaluation was carried out in the same manner as in Example 12, except that the resin was changed to 60 wt % of high-crystalline PP (same as in Example 1)/30 wt % of low-crystalline α-olefin polymer (Idemitsu Kosan's low-stereoregularity PP "L-MODU•S400" (trade name))/10 wt % of thermal flowability improver (Yasuhara Chemical's terpene resin hydride "Clearon P125" (trade name)). The results are shown in Table 4.

The curl height was 1.1 cm and was low, and the handleability of the sheet was extremely excellent. An unwindability evaluation of the projections-fixed sheet was carried out, and no projections stuck to the sheet and smooth unwinding was possible. In addition, no broken parts were seen in the projections-fixed sheet, and the unwindability and the quality of the sheet were extremely good.

Example 14

As a resin constituting projections, composition pellets containing 40 wt % of high-crystalline PP (same as in Example 1)/45 wt % of low-crystalline α-olefin polymer (Idemitsu Kosan's low-stereoregularity PP "L-MODU•S400" (trade name))/15 wt % of thermal flowability improver (Yasuhara Chemical's terpene resin hydride "Clearon P145" (trade name)) were melted at 180° C., and, via a gear pump, the resin melt was fed into an applicator equipped with a comb-shaped shim (slit width: 0.30 mm, pitch: 0.6 mm).

Next, the resin melt was discharged out from the comb-shaped shim, and projections were stripe-like formed on a sheet (polyethylene terephthalate long-fiber nonwoven fabric, single yarn fineness: 1.4 dtex, thickness: 50 µm, unit weight: 33 g/m$^2$) at a rate of 15 in/min, and via a free roll, this was wound up around a winder to obtain a sheet roll (winding tension: 15 N/m, core diameter used in winding: 3 inches). 10 m of the sheet was unwound from the sheet roll to obtain a sheet to which projections were fixed (sheet channel member).

The resultant sheet channel member was evaluated in the same manner as in Example 12. The results are shown in Table 4.

The curl height was 0.7 cm and was low, and the handleability of the sheet was extremely excellent. An unwindability evaluation of the projections-fixed sheet was carried out, and 5 projections stuck to the sheet but lightly, and relatively smooth unwinding was possible. No broken parts were seen in the projections-fixed sheet, and the unwindability and the quality of the sheet were extremely good.

Example 15

As a resin constituting projections, composition pellets containing 45 wt % of high-crystalline PP (same as in Example 10)/45 wt % of low-crystalline α-olefin polymer (Idemitsu Kosan's low-stereoregularity PP "L-MODU•S400" (trade name))/10 wt % of thermal flowability improver (Arakawa Chemical Industry's hydrogenated petroleum resin "alicyclic saturated hydrocarbon resin Alcon P100" (trade name)) were melted at 210° C., and, via a gear pump, the resin melt was fed into an applicator equipped with a comb-shaped shim (slit width: 0.30 mm, pitch: 0.6 mm).

Next, the resin melt was discharged out from the comb-shaped shim, and projections were stripe-like formed on a sheet (polyethylene terephthalate short-fiber nonwoven fabric, single yarn fineness: 1.2 dtex, thickness: 75 µm, unit weight: 75 g/m$^2$) at a rate of 4 m/min, and via a free roll, this was wound up around a winder to obtain a sheet roll (winding tension: 15 N/m, core diameter used in winding: 3 inches). 10 m of the sheet was unwound from the sheet roll to obtain a sheet to which projections were fixed (sheet channel member).

The resultant sheet channel member was evaluated in the same manner as in Example 12. The results are shown in Table 4.

The curl height was 0.9 cm and was low, and the handleability of the sheet was extremely excellent. An unwindability evaluation of the projections-fixed sheet was carried out, and 4 projections stuck to the sheet but lightly, and relatively smooth unwinding was possible. Two broken parts were seen in the projections-fixed sheet, but the unwindability and the quality of the sheet were extremely good.

Example 16

As a resin constituting projections, composition pellets containing 50 wt % of high-crystalline PP (same as in Example 1)/45 wt % of low-crystalline α-olefin polymer (B-1) (Idemitsu Kosan's low-stereoregularity PP "L-MODU•S400" (trade name))/5 wt % of low-crystalline α-olefin polymer (B-2) (Mitsui Chemical's propylene-olefin copolymer "Tafmer PN-20300" (trade name)) were melted at 200° C., and, via a gear pump, the resin melt was fed into an applicator equipped with a comb-shaped shim (slit width: 0.4 mm, pitch: 0.8 mm).

Next, the resin melt was discharged out from the comb-shaped shim, and projections were stripe-like formed on a sheet (polyethylene terephthalate long-fiber nonwoven fabric, single yarn fineness: 1.2 dtex, thickness: 48 µm, unit weight: 25 g/m$^2$) at a rate of 6 m/min, and via a free roll, this was wound up around a winder to obtain a sheet roll (winding tension: 15 N/m, core diameter used in winding: 3 inches). 10 m of the sheet was unwound from the sheet roll to obtain a sheet to which projections were fixed (sheet channel member).

The resultant sheet channel member was evaluated in the same manner as in Example 12. The results are shown in Table 4.

The curl height was 0.6 cm and was low, and the handleability of the sheet was extremely excellent. An unwindability evaluation of the projections-fixed sheet was carried out, and no projections stuck to the sheet, and smooth unwinding was possible. No broken parts were seen in the projections-fixed sheet, and the unwindability and the quality of the sheet were extremely good.

Example 17

As a resin constituting projections, composition pellets containing 50 wt % of high-crystalline PP (same as in Example 1)/25 wt % of low-crystalline α-olefin polymer (Mitsui Chemical's propylene-olefin copolymer "Tafmer PN-20300" (trade name))/25 wt % thermal flowability improver (Yasuhara Chemical's terpene resin hydride "Clearon P145" (trade name)) were melted at 210° C., and, via a gear pump, the resin melt was fed into an applicator equipped with a comb-shaped shim (slit width: 0.4 mm, pitch: 0.8 mm).

Next, the resin melt was discharged out from the comb-shaped shim, and projections were stripe-like formed on a sheet (polyethylene terephthalate long-fiber nonwoven fabric, single yarn fineness: 1.2 dtex, thickness: 73 µm, unit weight: 50 g/m$^2$) at a rate of 9 m/min, and via a free roll, this was wound up around a winder to obtain a sheet roll (winding tension: 15 N/m, core diameter used in winding: 3 inches). 10 m of the sheet was unwound from the sheet roll to obtain a sheet to which projections were fixed (sheet channel member).

The resultant sheet channel member was evaluated in the same manner as in Example 12. The results are shown in Table 4.

The curl height was 1.1 cm and was low, and the handleability of the sheet was extremely excellent. An unwindability evaluation of the projections-fixed sheet was carried out, and 3 projections stuck to the sheet but lightly, and relatively smooth unwinding was possible. Four broken parts were seen in the projections-fixed sheet, but the quality of the sheet was good.

TABLE 4

|  |  |  | Example 12 | Example 13 | Example 14 |
|---|---|---|---|---|---|
| Permeate-side Channel Member | Where the resin fixed | | Sheet | sheet | sheet |
| | Constituent Resins and Compositional Ratio | high-crystalline polypropylene (A) | PP | PP | PP |
| | | low-crystalline α-olefin polymer (B) | low-stereoregularity PP (L-MODU S400) | low-stereoregularity PP (L-MODU S400) | low-stereoregularity PP (L-MODU S400) |
| | | additive (C) | no | terpene resin hydride (Clearon P-125) | terpene resin hydride (Clearon P-145) |
| | | additive (D) | no | no | no |
| | | weight ratio (A)/(B)/(C)/(D) | 45/55/0/0 | 60/30/10/0 | 40/45/15/0 |
| | Melt Viscosity [Pa · s] of constituent resin | | 11.0 | 11.2 | 8.8 |
| | Melting Endothermic Energy Amount (ΔH) [J/g] | | 33 | 47 | 24 |
| | Mechanical Properties | Tensile Elongation [%] | 26 | 14 | 20 |
| | | Tensile Elasticity [GPa] | 0.29 | 0.61 | 0.40 |
| | Height of projections [μm] | | 254 | 260 | 272 |
| | Spacing of projections [μm] | | 352 | 360 | 358 |
| | Curling Evaluation of Sheet | | A | A | A |
| | Unwindability evaluation of Sheet | | A | A | B |
| | Quality Evaluation of Sheet | | A | A | A |
| Element Performance (operation pressure 1.5 MPa) | water production amount [m³/day] | | 34.3 | 34.4 | 34.1 |
| | TDS removal ratio [%] | | 98.9 | 98.8 | 98.8 |
| Element Performance (operation pressure 2.5 MPa) | water production amount [m³/day] | | 54.4 | 56.2 | 54.5 |
| | TDS removal ratio [%] | | 99.1 | 99.0 | 99.0 |

|  |  |  | Example 15 | Example 16 | Example 17 |
|---|---|---|---|---|---|
| Permeate-side Channel Member | Where the resin fixed | | sheet | sheet | sheet |
| | Constituent Resins and Compositional Ratio | high-crystalline polypropylene (A) | PP (low MFR) | PP | PP |
| | | low-crystalline α-olefin polymer (B) | low-stereoregularity PP (L-MODU S400) | low-stereoregularity PP (L-MODU S400) | olefin elastomer (Tafmer PN-20300) |
| | | additive (C) | hydrogenated petroleum resin (Alcon P-100) | olefin elastomer (Tafmer PN-20300 | terpene resin hydride (Clearon P-145) |
| | | additive (D) | no | no | no |
| | | weight ratio (A)/(B)/(C)/(D) | 45/45/10/0 | 50/45/5/0 | 50/25/25/0 |
| | Melt Viscosity [Pa · s] of constituent resin | | 33.5 | 13.4 | 45.0 |
| | Melting Endothermic Energy Amount (ΔH) [J/g] | | 37 | 38 | 41 |
| | Mechanical Properties | Tensile Elongation [%] | 13 | 24 | 10 |
| | | Tensile Elasticity [GPa] | 0.45 | 0.53 | 0.58 |
| | Height of projections [μm] | | 225 | 243 | 266 |
| | Spacing of projections [μm] | | 306 | 406 | 398 |
| | Curling Evaluation of Sheet | | A | A | A |
| | Unwindability evaluation of Sheet | | A | A | A |
| | Quality Evaluation of Sheet | | A | A | B |
| Element Performance (operation pressure 1.5 MPa) | water production amount [m³/day] | | 34.0 | 34.4 | 33.8 |
| | TDS removal ratio [%] | | 98.6 | 98.5 | 98.4 |
| Element Performance (operation pressure 2.5 MPa) | water production amount [m³/day] | | 54.5 | 55.4 | 55.1 |
| | TDS removal ratio [%] | | 99.1 | 98.9 | 98.6 |

Comparative Example 5

An evaluation was carried out in the same manner as in Example 12, except that the resin constituting the projections was changed to high-crystalline PP (same as in Example 1) alone. The results are shown in Table 5.

The curl height of the projections-fixed sheet was 10 cm or more and was extremely high, and the handleability was extremely bad. An unwindability evaluation of the projections-fixed sheet was carried out. No projections stuck to the sheet. Eleven projections were broken, and the quality of the sheet was extremely bad.

Comparative Example 6

An evaluation was carried out in the same manner as in Example 12, except that the resin was changed to 96 wt % of high-crystalline PP (same as in Example 1)/4 wt % of low-crystalline α-olefin polymer (Idemitsu Kosan's low-stereoregularity PP "L-MODU•S400" (trade name)). The results are shown in Table 5.

The curl height of the sheet was 7.4 cm and was high, and the handleability was bad. An unwindability evaluation of the sheet was carried out. No projections stuck to the sheet, and smooth unwinding was possible. Seven projections were broken, and the quality of the sheet was bad.

Comparative Example 7

An evaluation was carried out in the same manner as in Example 12, except that the resin was changed to 35 wt % of high-crystalline PP (same as in Example 1)/60 wt % of low-crystalline α-olefin polymer (Idemitsu Kosan's low-stereoregularity PP "L-MODU•S400" (trade name))/5 wt % of talc (Hayashi chemical's "Micron White 5000S" (trade name)). The results are shown in Table 5.

The curl height of the sheet was 0.3 cm and was extremely low, and the handleability was extremely good. An unwindability evaluation of the sheet was carried out. Six projections stuck to the sheet, and smooth unwinding was difficult. One projection was broken, and the quality of the sheet was extremely good.

The desalination ratio and the water production amount were measured in the same manner as in Example 12. Regarding the element performance, the desalination ratio was 98.3% and was good, but the water production amount was 28.0 m³/day (operation pressure: 1.5 MPa), and was lower by 20% or more than that in the above-mentioned Example 12. After the operation, the projections on the sheet were checked. The projections were compressively deformed and the permeated water flow channel clogged. This is considered because the content of the high-crystalline PP resin constituting the projections was small and the pressure resistance (elasticity) was low.

Comparative Example 8

An evaluation was carried out in the same manner as in Example 12, except that the resin was changed to 30 wt % of high-crystalline PP (same as in Example 1)/50 wt % of low-crystalline α-olefin polymer (Idemitsu Kosan's low-stereoregularity PP "L-MODU•S400" (trade name))/20 wt % of thermal flowability improver (Yasuhara Chemical's terpene resin hydride "Clearon P125" (trade name)). The results are shown in Table 5.

The curl height of the sheet was 0.2 cm and was extremely low, and the handleability was extremely good. An unwindability evaluation of the sheet was carried out. Ten projections stuck to the sheet, and smooth unwinding was difficult. On the other hand, no projections were broken, and the quality of the sheet was extremely good.

The desalination ratio and the water production amount were measured in the same manner as in Example 12. Regarding the element performance, the desalination ratio was 98.4% and was good, but the water production amount was 25.3 m³/day (operation pressure: 1.5 MPa), and was lower by 25% or more than that in the above-mentioned Example 12. After the operation, the projections on the sheet were checked. The projections were compressively deformed and the permeated water flow channel clogged. This is considered because the content of the high-crystalline PP resin constituting the projections was small and the pressure resistance (elasticity) was low.

TABLE 5

| | | | Comparative Example 5 | Comparative Example 6 | Comparative Example 7 | Comparative Example 8 |
|---|---|---|---|---|---|---|
| Permeate-side Channel Member | | Where the resin fixed | sheet | sheet | sheet | sheet |
| | Constituent Resins and Compositional Ratio | high-crystalline polypropylene (A) | PP | PP | PP | PP |
| | | low-crystalline α-olefin polymer (B) | no | low-stereoregularity PP (L-MODU S400) | low-stereoregularity PP (L-MODU S400) | low-stereoregularity PP (L-MODU S400) |
| | | additive (C) | no | no | talc | terpene resin hydride (Clearon P-125) |
| | | additive (D) | no | no | no | no |
| | | weight ratio (A)/(B)/(C)/(D) | 100/0/0/0 | 96/4/0/0 | 35/60/5/0 | 30/50/20/0 |
| | Melt Viscosity [Pa · s] of constituent resin | | 26.1 | 23.0 | 12.0 | 5.2 |
| | Melting Endothermic Energy Amount (ΔH) [J/g] | | 81 | 73 | 21 | 16 |
| | Mechanical Properties | Tensile Elongation [%] | 2 | 4 | 18 | 19 |
| | | Tensile Elasticity [GPa] | 1.29 | 1.16 | 0.17 | 0.08 |
| | Height of projections [μm] | | 250 | 255 | 253 | 260 |
| | Spacing of projections [μm] | | 345 | 348 | 349 | 352 |
| | Curling Evaluation of Sheet | | D | C | A | A |
| | Unwindability evaluation of Sheet | | A | A | C | D |
| | Quality Evaluation of Sheet | | D | C | A | A |
| Element Performance (operation pressure 1.5 MPa) | | water production amount [m³/day] | 34.2 | 34.1 | 28.0 | 25.3 |
| | | TDS removal ratio [%] | 98.5 | 98.6 | 98.3 | 98.4 |
| Element Performance (operation pressure 2.5 MPa) | | water production amount [m³/day] | 56.9 | 56.4 | 49.0 | 33.0 |
| | | TDS removal ratio [%] | 98.8 | 98.8 | 98.7 | 98.8 |

In the foregoing paragraphs of this description, the present invention has been illustrated in detail by reference to the specified embodiments. It will, however, be apparent to one skilled in the art that various changes and modifications can be made therein without departing from the spirit and scope of the invention. The present application is based on Japanese Patent Application No. 2013-225516 filed on Oct. 30, 2013, the contents of which are incorporated herein by reference.

INDUSTRIAL APPLICABILITY

The separation membrane and the separation membrane element according to the present invention can be used suitably for desalination of brackish water in particular.

DESCRIPTION OF REFERENCE NUMERALS AND SIGNS

1 Separation membrane element
2 Feed-side channel member
3 Separation membrane
30, 30A, 30B Separation membrane main body
4 Permeate-side channel member
5 Envelope-shaped membrane
6 Water collection tube
7 Feed water (raw fluid)
8 Permeated water
9 Concentrated water
11 Substrate
12 Porous supporting layer
13 Separation functional layer
15 Permeate-side flow channel
17 Feed-side face
18 Permeate-side face
19 Sheet
20 to 25 Projections
42 to 47 Sheet channel member

The invention claimed is:

1. A separation membrane comprising: a separation membrane main body having a feed-side face and a permeate-side face; and a permeate-side channel member adhered to the permeate-side face of the separation membrane main body,
wherein the permeate-side channel member comprises a composition containing at least a high-crystalline polypropylene (A) and satisfies the following requirements (a) and (b):
(a) a content of the high-crystalline polypropylene (A) in the composition is from 40 to 95% by weight; and
(b) the permeate-side channel member has a melting endothermic energy amount ($\Delta H$) of from 20 to 70 J/g.

2. The separation membrane according to claim 1, wherein the permeate-side channel member has a tensile elongation of 5% or more and a tensile elasticity of from 0.2 to 2.0 GPa.

3. The separation membrane according to claim 1, wherein the separation membrane main body comprises a substrate, a porous supporting layer formed on the substrate, and a separation functional layer formed on the porous supporting layer.

4. A separation membrane element comprising the separation membrane according to claim 1.

5. The separation membrane according to claim 1, wherein the permeate-side channel member has a tensile elongation of 5% or more and a tensile elasticity of from 0.2 to 2.0 GPa.

6. A sheet channel member having projections fixed to a sheet, wherein the projections comprise a composition containing at least a high-crystalline polypropylene (A) and satisfy the following requirements (a) and (b):
(a) a content of the high-crystalline polypropylene (A) in the composition is from 40 to 95% by weight; and
(b) the projections have a melting endothermic energy amount ($\Delta H$) of from 20 to 70 J/g.

7. The sheet channel member according to claim 6, wherein the projections have a tensile elongation of 5% or more and a tensile elasticity of from 0.2 to 2.0GPa.

8. A separation membrane element comprising the sheet channel member according to claim 7.

9. A separation membrane element comprising the sheet channel member according to claim 6.

* * * * *